April 12, 1960 V. J. HAWKS ET AL 2,932,694

RURAL CARRIER TELEPHONE TRANSMISSION SYSTEM

Filed Sept. 10, 1954 9 Sheets-Sheet 1

INVENTORS V. J. HAWKS
E. K. VAN TASSEL
D. C. WELLER
BY R. B. Ardis
ATTORNEY

OFFICE TERMINAL

INVENTORS V. J. HAWKS
E. K. VAN TASSEL
D. C. WELLER

BY R. B. Ardis
ATTORNEY

OUTLYING TERMINAL (PART I)

INVENTORS V. J. HAWKS
E. K. VAN TASSEL
D. C. WELLER
BY R. B. Ardis
ATTORNEY

April 12, 1960 V. J. HAWKS ET AL 2,932,694

RURAL CARRIER TELEPHONE TRANSMISSION SYSTEM

Filed Sept. 10, 1954 9 Sheets-Sheet 4

OUTLYING TERMINAL (PART II)

INVENTORS V. J. HAWKS
E. K. VAN TASSEL
D. C. WELLER

BY R. B. Ardis
ATTORNEY

FIG. 4B EXPANDOR
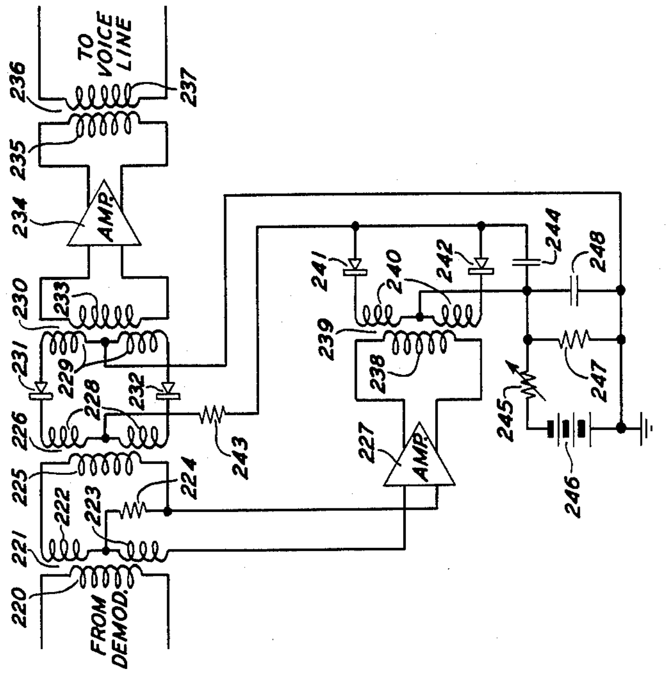
FIG. 4A COMPRESSOR
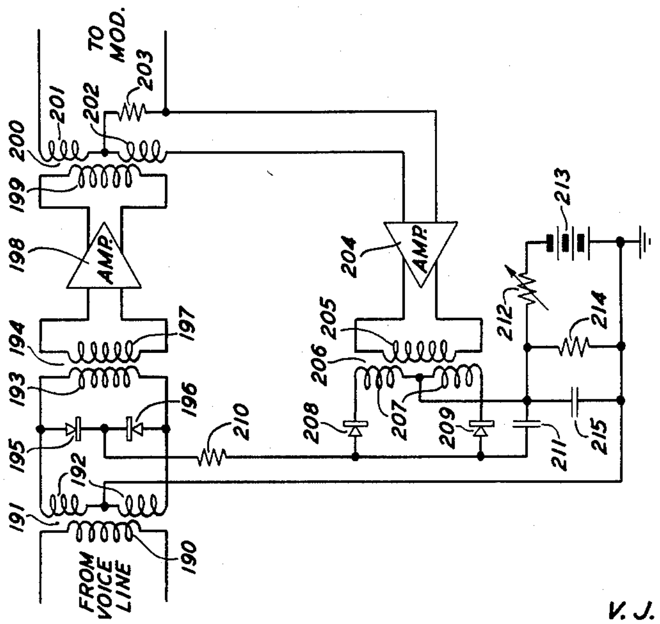
INVENTORS V. J. HAWKS
E. K. VAN TASSEL
D. C. WELLER
BY R. B. Ardis
ATTORNEY April 12, 1960 V. J. HAWKS ET AL 2,932,694

RURAL CARRIER TELEPHONE TRANSMISSION SYSTEM

Filed Sept. 10, 1954 9 Sheets-Sheet 6

INVENTORS V. J. HAWKS
E. K. VAN TASSEL
D. C. WELLER
BY R. B. Ardis
ATTORNEY

FIG. 6A
RINGING CODE
| PARTY | LINE | $f_1$ | $f_2$ | $f_3$ |
|---|---|---|---|---|
| A | +R | ✓ | | ✓ |
| B | −R | ✓ | | |
| C | +T | ✓ | ✓ | |
| D | −T | ✓ | ✓ | ✓ |
FIG. 6B
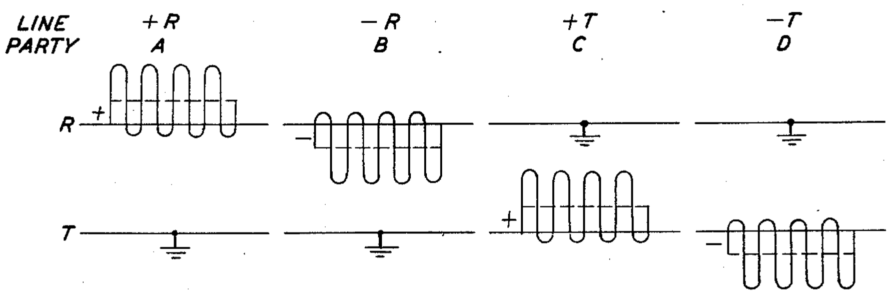
FIG. 6C
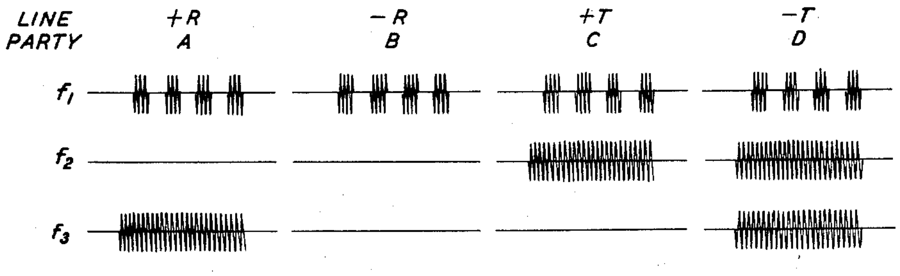
FIG. 6D
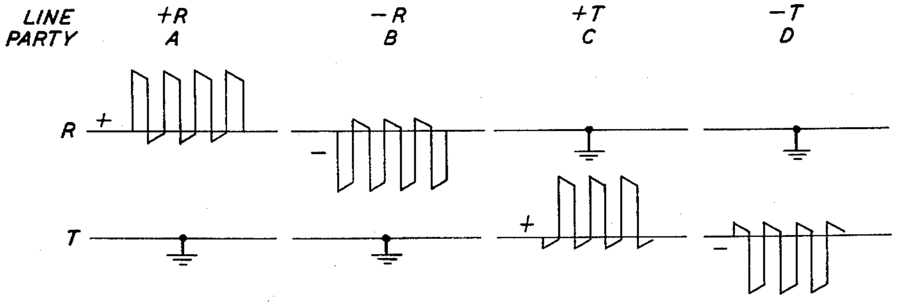
INVENTORS V. J. HAWKS
E. K. VAN TASSEL
D. C. WELLER
BY R. B. Ardis
ATTORNEY

OUTLYING TERMINAL (PART II)

INVENTORS V. J. HAWKS
E. K. VAN TASSEL
D. C. WELLER
BY R. B. Ardis
ATTORNEY

FIG. 8A
RINGING CODE
| PARTY | LINE | $f_1$ | $f_2$ | $f_3$ |
|---|---|---|---|---|
| A | +R | ✓ | | ✓ |
| B | −R | ✓ | | |
| C | +T | ✓ | ✓ | ✓ |
| D | −T | ✓ | ✓ | |
FIG. 8B
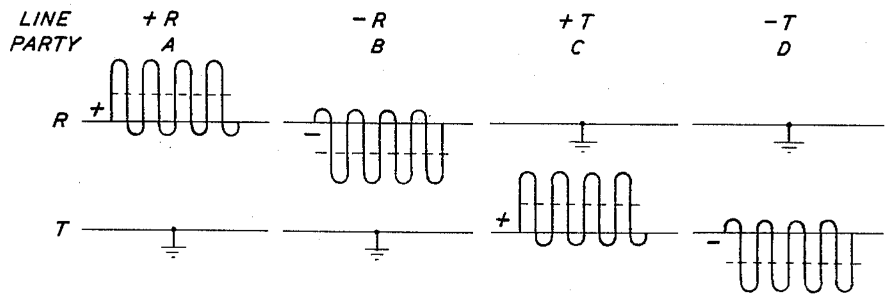
FIG. 8C
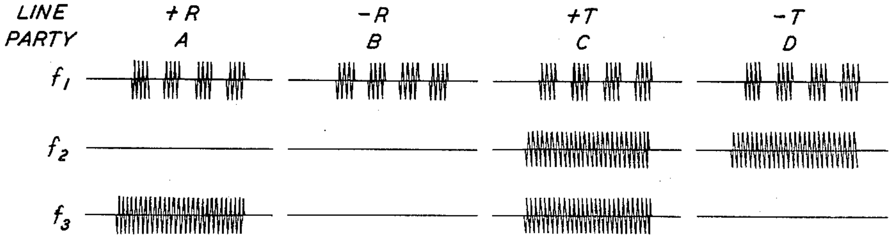
FIG. 8D
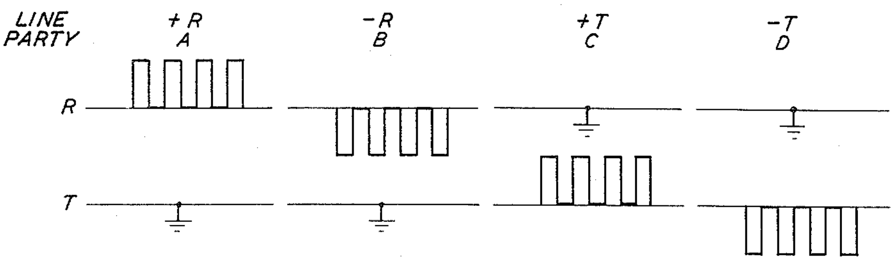
INVENTORS V. J. HAWKS
E. K. VAN TASSEL
D. C. WELLER
BY R. B. Ardis
ATTORNEY United States Patent Office 2,932,694

Patented Apr. 12, 1960

2,932,694

RURAL CARRIER TELEPHONE TRANSMISSION SYSTEM

Verl J. Hawks, Morristown, Earl K. Van Tassel, Westfield, and David C. Weller, Lake Mohawk, N.J., assignors to Bell Telephone Laboratories, Incorporated, New York, N.Y., a corporation of New York Application September 10, 1954, Serial No. 455,099

14 Claims. (Cl. 179—15)

This invention relates generally to telephone communication systems and more particularly, although in its broader aspects not exclusively, to telephone systems for use in relatively sparsely settled areas and has for its principal object expansion of the telephone service available in rural areas.

In the present rural telephone plant, subscribers within a particular area are generally served from a common switching center, either automatic or manual, to which they are connected by a network of voice-frequency transmission lines. The switching center is known as a central office; and, while the transmission lines may be in the form of underground cables, they are most commonly in the form of the familiar pole-carried open-wire lines and cables which extend across so much of the present-day countryside. Voice signals flow in both directions over these lines from the central office to the widely scattered subscribers and from the subscribers to the central office. Other intelligence necessary to the operation of the system generally flows only in one direction, from the central office to the subscribers in the case of ringing signals and from the subscribers to the central office in the case of supervisory and dialing signals. The central office is generally connected into the remainder of the nationwide telephone plant by means of trunks or toll channels to accommodate calls originating from or intended for subscribers outside of its own local subscriber system.

Once the voice-frequency transmission lines of a rural telephone system of this type are used to capacity, further expansion of telephone service becomes difficult. What would be a relatively minor problem of providing additional lines in a thickly settled urban area constitutes a major obstacle in a rural area in which the potential subscribers are widely scattered and located at considerable distances from the central office.

In what is generally known as the cross-country toll telephone plant, i.e., that portion of the telephone plant used to interconnect distant central offices, carrier techniques are used extensively to expand service without increasing the number of transmission lines required. Instead of being transmitted over separate lines at voice frequencies, a number of messages are used to modulate different carrier frequencies, and the resulting carrier-frequency bands are transmitted over the same carrier line. By providing separate carrier channels for different directions of transmission, a toll carrier system of this type carries voice messages in both directions between the inter-coupled central offices. Along with these voice messages go the associated supervisory and, when appropriate, dialing signals.

In the past, however, carrier techniques have not been applied widely to the rural telephone plant for a number of reasons. In the first place, toll carrier transmission systems usually involve a large number of message channels between two centralized terminal locations, permitting efficient use of equipment which is common to some or all of the various channels. In the rural plant, however, there is only one centralized terminal point, the central office. The individual subscribers, who are served from the central office either on single or multiparty lines, are widely dispersed. In the second place, the saving in the cost of wire and cable that interconnect two terminal points separated by many miles can justify the relatively high cost of toll carrier terminals. In the rural telephone plant, on the other hand, the possible savings per channel are much smaller and the cost of toll-type carrier terminals cannot usually be justified. In addition, terminal equipment of the type used in toll carrier systems tends to be so bulky and to require such large amounts of power for its operation as substantially to require its location on the premises of the central offices or other terminal locations with which it is associated. Operation and maintenance in particular are facilitated by such location. In the rural plant, the only centralized location at which terminal equipment can be placed is the central office. Since the subscribers are scattered, there is no convenient on-the-premises location at which to place terminal equipment for the subscriber end of all channels. Finally, the nature of the signalling and supervision carried by a toll carrier system is generally different from that used in the subscriber loop in the rural plant. In the rural plant, as has already been noted, supervisory and dialing signals are transmitted only in one direction, while relatively high-power ringing signals are transmitted in the other direction.

In its broader aspects, the invention takes the form of a carrier telephone system which may be used to expand readily the telephone service available from a central office to surrounding subscribers and potential subscribers rather than merely to increase the connections available between operators or offices. In particular, the present invention features a plurality of primary carrier terminals located at the telephone central office and a similar number of unattended secondary or satellite carrier terminals located at a number of remote but scattered points near the subscribers. Each carrier terminal converts from voice to carrier for outgoing messages and from carrier to voice for incoming messages. Each office or primary terminal is associated with a particular one of the outlying satellite terminals and cooperates with it to provide a single two-way telephone communication channel which may be multiplexed on a carrier-frequency basis with other similar channels provided by other office and primary terminal pairs. Each carrier channel so provided is the full equivalent of the voice telephone line usually used for coupling a subscriber or a multiparty-line group of subscribers to the central office and is adapted to carry the same messages and to pass the same ringing, supervisory, and dialing information.

In a typical embodiment, the invention takes the form of a rural carrier telephone transmission system which includes a plurality of primary carrier terminals located at an attended or unattended central office and a like number of unattended secondary or satellite terminals mounted on ordinary telephone poles at remote points near the subscribers for whom telephone service is to be provided. In such a system, a single carrier transmission line may, for example, leave the central office carrying a large number of carrier channels and extend, on poles, along the side of a highway passing through a relatively thinly populated farming region. Wherever a single-party or "private line" service is provided, a secondary or satellite carrier terminal is mounted on a carrier-line pole in the vicinity of the subscriber's premises, and that particular channel is coupled to the subscriber's telephone set by an ordinary voice-frequency telephone transmission line or "drop wire." Wherever multiparty-line service is provided, a secondary or satellite carrier terminal is mounted on one of the carrier-line poles convenient geographically to all of the subscribers served therefrom, and that channel is continued on through a pole-carried voice-frequency telephone line and coupled therefrom by drop wires to the individual subscriber sets. In each instance, the remaining carrier channels are transmitted on past the outlying carrier terminals used to "drop off" the first channels. Other carrier channels are dropped off, either one at a time or in groups, at whatever distance intervals the demand for service requires.

A particular feature of the invention permits multiparty-line subscribers in a rural area to be provided with service directly from the carrier line when they are located along the path of the carrier line rather than off in a common direction therefrom. Such a condition might, for example, exist when a number of multiparty-line subscribers are located at intervals along the particular highway followed by the carrier line. In accordance with this feature of the invention, the outlying or satellite carrier terminal of a particular channel is provided at a point along the carrier line located relatively toward the central office from the subscriber group served thereby, filter means is provided to bypass the carrier frequencies of other channels around the satellite terminal and to reinsert demodulated voice-frequency signals from the terminal onto the line on the side of the terminal remote from the central office, and drop wires and low-pass filters are provided at appropriate intervals along the carrier line to distribute the reinserted voice-frequency signals directly to the subscribers from the carrier line. Where warranted, e.g., when multiparty-line subscribers served through other channels are also located along the path of the carrier line, this feature of the invention is repeated and the other channels are also distributed at voice frequencies directly from the carrier line. The carrier line is then, in effect, divided into a series of successive sections, each of which carries a different two-way message channel at voice frequencies in addition to the carrier-frequency channels carried for distribution at some point more distant from the central office.

The invention is also featured by the use of transistors as the active gain-producing elements in the various office and outlying carrier terminals. Transistors are not only small but also are sufficiently reliable to permit circuits employing them to be used in unattended weather-exposed terminals mounted on telephone poles at considerable distances from the central office. Maintenance problems in particular are substantially reduced from those encountered in the toll carrier systems found in the prior art. In addition, the power consumption of transistors is many times lower than that of vacuum tubes, greatly simplifying the problems involved in supplying power to the outlying or satellite carrier terminals featured by the invention. In rural carrier telephone systems embodying the invention, the low power requirements of transistors make possible the use of primary power supplies at the pole-mounted outlying or satellite terminals. The cost and complexity involved in transmitting power over the carrier or a separate line to each outlying terminal is thereby avoided.

Still another feature of the invention contributes further towards permitting the use of primary power sources at the pole-mounted outlying carrier terminals. A major operational difference between transistors and vacuum tubes is that the former require no warm-up period before becoming fully operative. As a result, it is not necessary to supply power to many portions of a transistorized rural carrier telephone system embodying the invention except during talking intervals. In accordance with a feature of the invention, power is removed from the transmitting section of each outlying or satellite carrier terminal while the terminal is at rest. The power requirements for each outlying terminal are reduced accordingly, further facilitating the use of local primary power supplies.

An additional feature of the invention permits subscriber ringing information to be transmitted over the carrier line in the direction from the central office to the called subscriber at a power level much less than that needed to accomplish actual ringing in the called subscriber's telephone set. In general, the power required for ringing is much greater than the normal level of signal transmission used for messages between the central office and a subscriber. In order to avoid having to provide power for this purpose on the subscriber's premises, it has been customary in the past to generate the necessary ringing signal at the central office and transmit it over the voice line to the called subscriber. In a rural telephone system featuring the present invention, however, the power handling capacities of the office and outlying carrier terminals are not normally adequate to permit transmission of the ringing signal in the form provided by the standard central office equipment. This is particularly so when, as in accordance with a feature of the present invention, transistors constitute the principal active gain-producing elements of the system. In addition, the standard ringing signal supplied for the more complex types of ringing on multiparty subscriber lines, i.e., four-party full-selective and eight-party semiselective ringing, is sufficiently different in its several variations which determine which party is to be rung as to defy transmission on anything but an all-voice-frequency basis.

In accordance with this feature of the invention, means is provided in each office or primary terminal to code subscriber ringing information in terms of a plurality of voice-frequency tones and transmit them on a carrier-frequency basis and, in each outlying or satellite terminal, to recreate subscriber ringing signal from the received tones and local power and to transmit it over the final subscriber voice line. In this manner, complete subscriber ringing information is transmitted over the carrier line all the way from the telephone central office to the outlying terminal at the power level of the voice messages rather than at the much higher power level needed to accomplish actual ringing. Any tendency to overload transistorized equipment during ringing intervals is avoided. Moreover, no change in the structure or operation of either the standard central office equipment for generating ringing signals or the subscriber equipment for utilizing them is required. Such equipment remains unaffected through the application of the invention. The invention may therefore be applied to existing telephone systems with a minimum of difficulty and delay.

The invention is further featured by means provided in each outlying or satellite carrier terminal to supply D.-C. power to the associated subscriber telephone sets during talking, as opposed to ringing, intervals. Any necessity either of providing power supplies on the subscriber premises for this purpose or of transmitting the necessary power over the carrier line all the way from the central office is thereby avoided.

Other objects and features of the invention will become apparent upon consideration of the following detailed description of the structure and operation of a typical embodiment. In the drawings.

Figures 1, 1A:
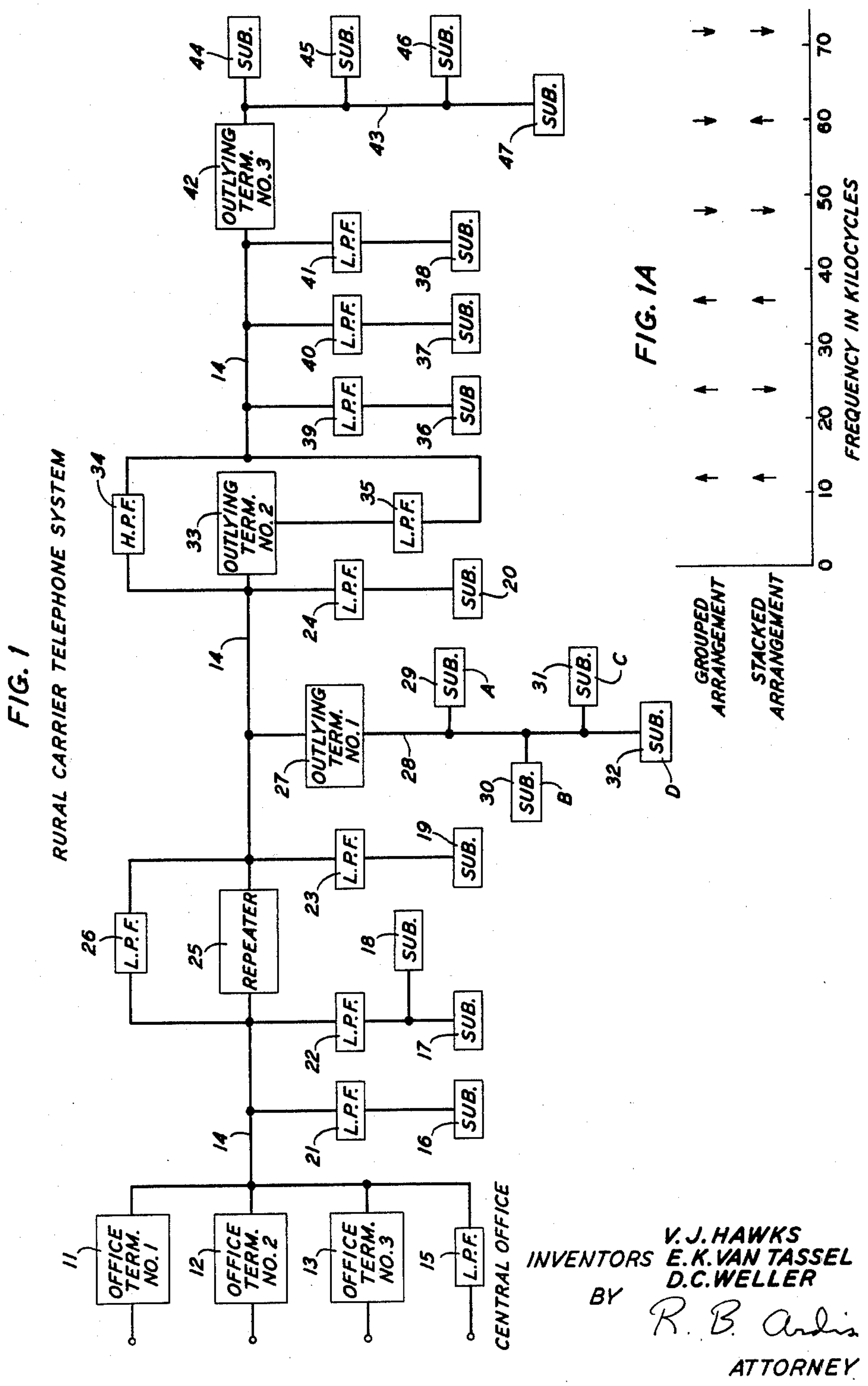
Fig. 1 is a block diagram of a typical rural telephone system embodying the present invention.
Fig. 1A is a chart illustrating two carrier-frequency allocations for the system shown in Fig. 1.
Figure 2:
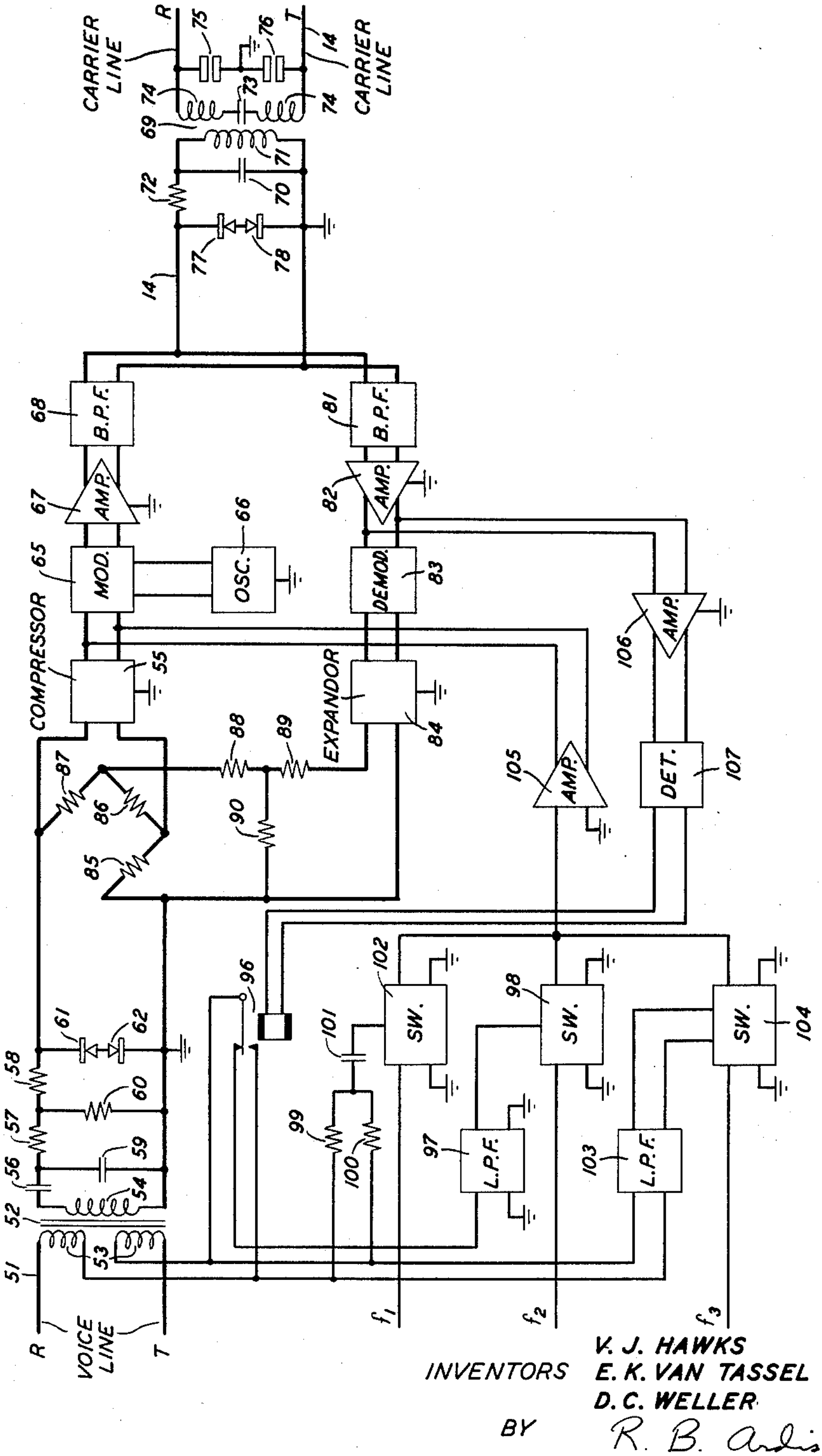
Fig. 2 illustrates an office carrier terminal embodying features of the invention and suitable for use in the rural carrier telephone system shown in Fig. 1.
Figure 3A:
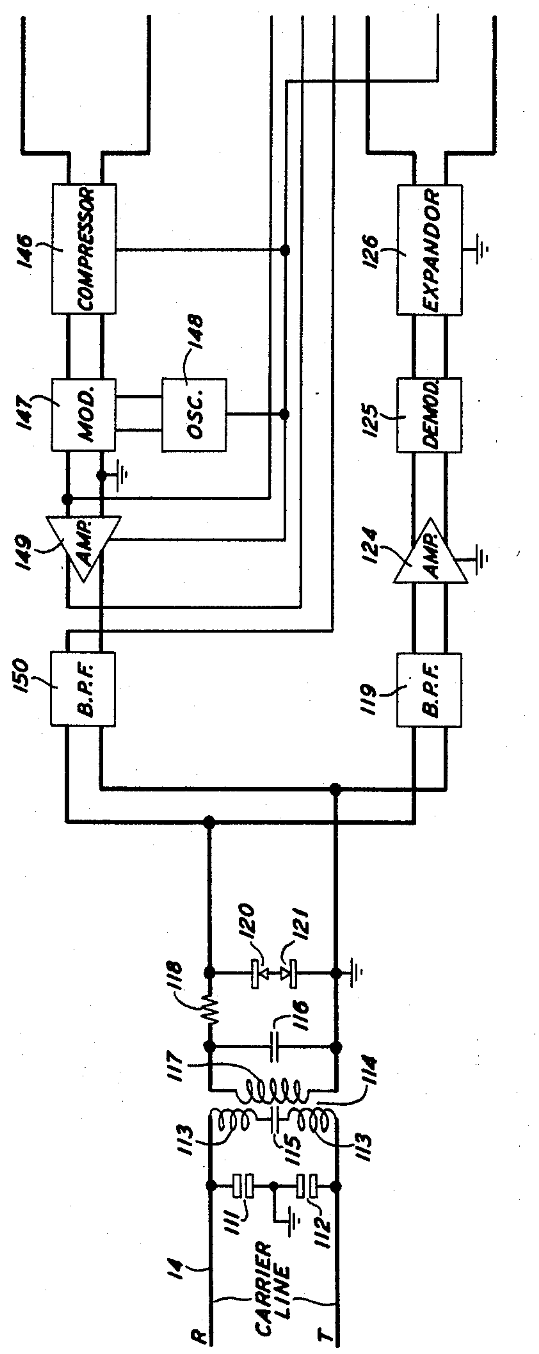
Figure 3B:
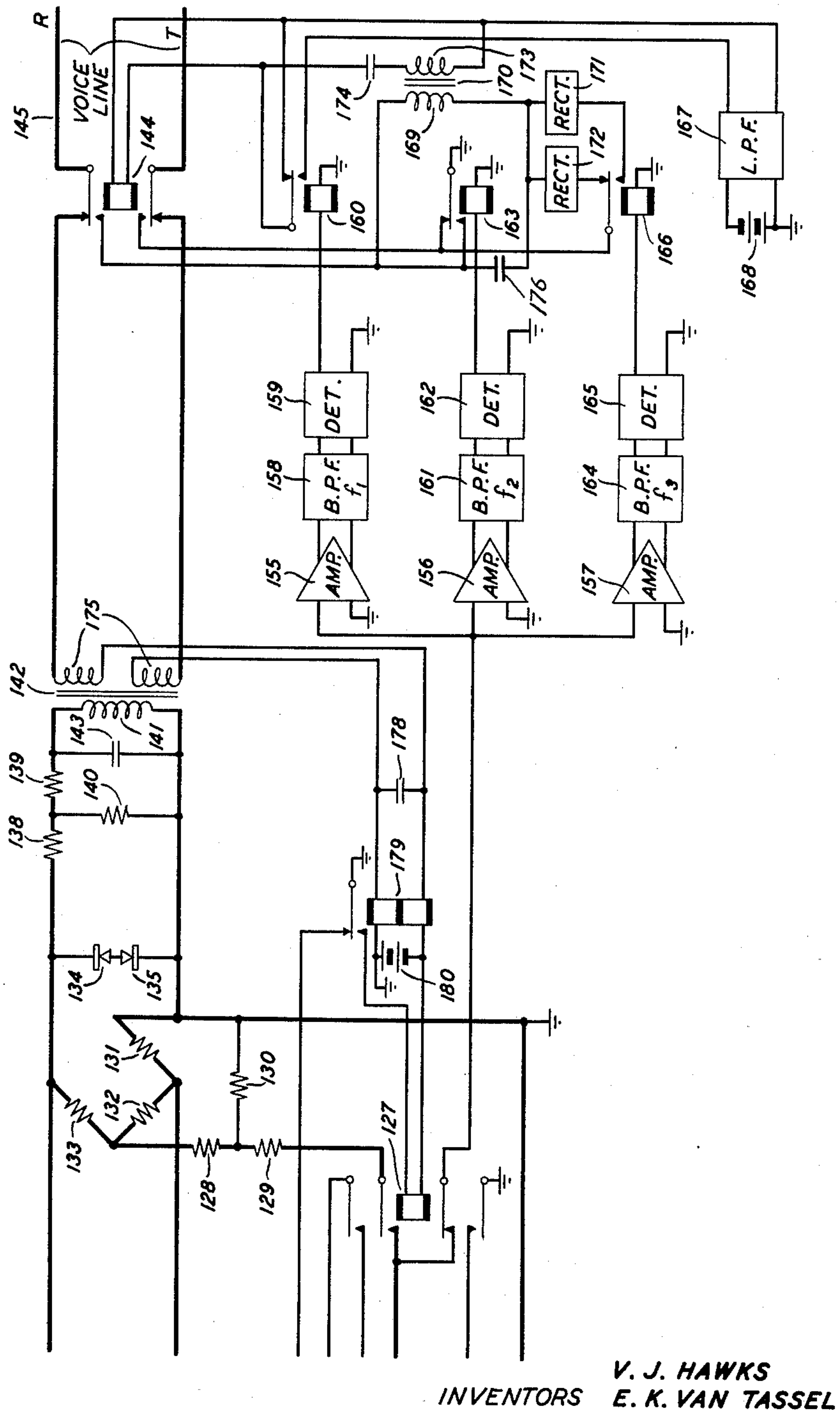
Figure 5:
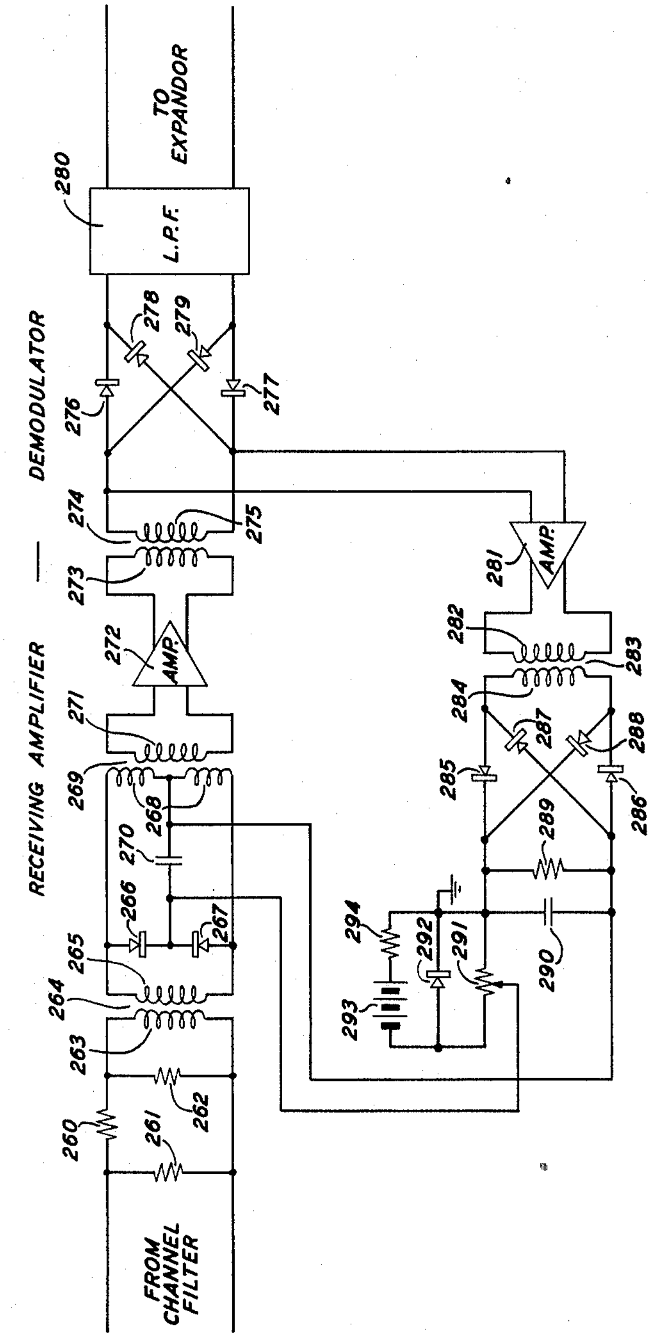
Figure 7:
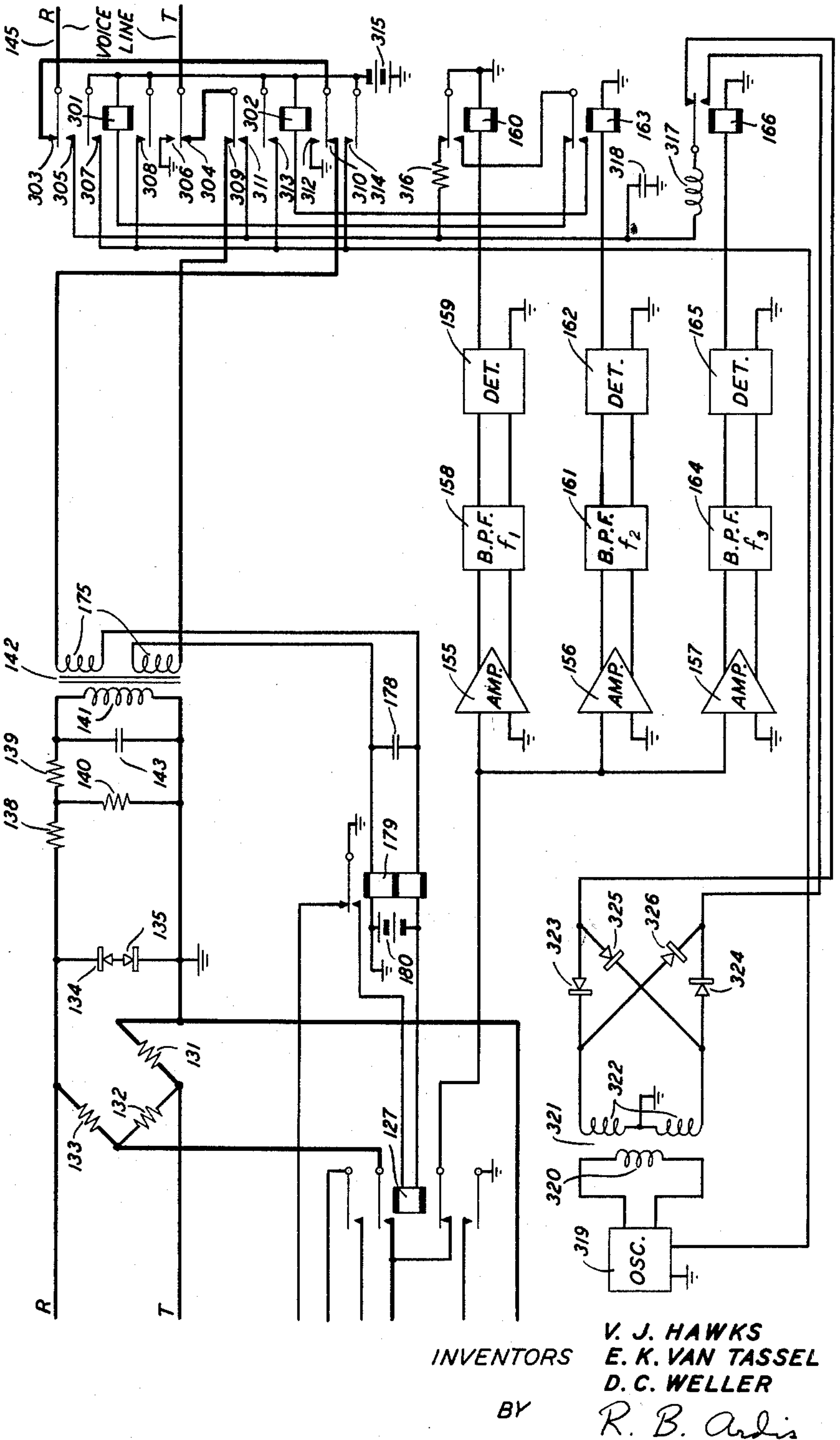

Figs. 3A and 3B, taken together, illustrate an outlying or satellite carrier terminal embodying features of the invention and suitable for use in the rural carrier telephone system shown in Fig. 1;

Figs. 4A and 4B show the compandor depicted in block diagram form in the embodiments of the invention illustrated in Figs. 2 and 3A;

Fig. 5 depicts the receiving amplifier and demodulator shown in block diagram form in the embodiments of the invention shown in Figs. 2 and 3A;

Fig. 6A is a chart showing the subscriber ringing code used in the carrier terminals illustrated in Figs. 2, 3A, and 3B;

Fig. 6B illustrates the ringing voltage wave-forms applied at the central office to the voice line of the office carrier terminal shown in Fig. 2;

Fig. 6C shows the voice-frequency-tone wave-forms generated, in accordance with a feature of the invention, to transmit the ringing information given in Fig. 6B over the carrier line;

Fig. 6D shows the ringing voltage wave-forms reconstructed from the voice-frequency tones of Fig. 6C at the outlying carrier terminal illustrated in Figs. 3A and 3B;

Fig. 7, taken with Fig. 3A, illustrates an alternative outlying or satellite carrier terminal embodying features of the invention and suitable for use in the system of Fig. 1;

Fig. 8A is a chart showing the subscriber ringing code used with the combination of carrier terminals illustrated in Figs. 2, 3A, and 7;

Fig. 8B is the same as Fig. 6B and illustrates the ringing voltage wave-forms applied at the central office to the voice line of the office carrier terminal shown in Fig. 2;

Fig. 8C shows the voice-frequency-tone wave-forms used, in accordance with the present invention, to transmit the ringing information of Fig. 8B over the carrier line to the outlying terminal of Figs. 3A and 7; and Fig. 8D shows the ringing voltage wave-forms reconstructed from the voice-frequency tones of Fig. 8C at the alternative outlying carrier terminal illustrated in Figs. 3A and 7.

*Rural carrier telephone system*

The rural telephone system illustrated in block diagram form in Fig. 1 represents a specific embodiment of the invention and includes, by way of example, four separate multiparty message channels. At the left-hand side of the figure, three primary or office carrier terminals 11, 12, and 13 are shown coupling three of the four central office message channels to the outgoing carrier- and voice-frequency transmission line 14. As explained previously, transmission line 14 may, for example, extend out into the countryside along a main or secondary highway and will, over most of its length, generally be in the form of pole-mounted open-wire line or cable. The fourth central office message channel is coupled to line 14 directly by a low-pass filter 15. Office terminals 11, 12, and 13 and filter 15 are located within and form part of the telephone central office and are supplied with standard voice and ringing signals by suitable standard office switching equipment, not shown. Each primary or office terminal includes, among other things, its own carrier source, its own modulator, and its own demodulator.

Subscribers on the multiparty line supplied from filter 15 may, by way of example, be located along the route of line 14 and are serviced directly on a voice-frequency basis from carrier line 14. For example, voice lines leading to subscriber sets 16, 17, 18, 19, and 20 are coupled to carrier line 14 at convenient intervals by drop wires including low-pass filters 21, 22, 23 and 24. The intervals are, of course, determined largely by the actual geographical locations of the individual subscriber telephone sets involved. By way of example, filter 21 supplies subscriber 16, filter 22 supplies subscribers 17 and 18, filter 23 supplies subscriber 19, and filter 24 supplies subscriber 20. These filters block all carrier frequencies but are substantially transparent to voice frequencies.

A pole-mounted carrier-frequency repeater 25 is inserted in transmission line 14 between, for example, filters 22 and 23. Since repeater 25 is, in general, opaque to voice frequencies, a low-pass filter 26 is provided to bypass voice-frequency signals around it.

A first pole-mounted outlying or satellite carrier terminal 27 is shown coupled to carrier line 14 at a point between filters 23 and 24. Terminal 27 includes its own carrier source, its own modulator, and its own demodulator and serves to demodulate the carrier frequencies originated by the corresponding first office carrier terminal 11. In addition, it supplies voice and ringing signals and transmitter power to subscriber sets on its particular multiparty subscriber line. The side of outlying terminal 27 remote from the central office is connected to a multiparty subscriber voice line 28. Subscribers 29, 30, 31, and 32, who may, for example, be located along a side road intersecting the main road followed by carrier line 14, are served directly from this voice line 28. In this example, satellite terminal 27 is mounted on a carrier line pole near the intersection of the two roads.

In Fig. 1, it will be noted, multiparty-line subscribers 29, 30, 31, and 32 are designated A, B, C, and D, respectively. As will become apparent later, this is an aid in explaining the features of the invention pertaining to the transmission of subscriber ringing information over the carrier line. These features of the invention permit these four subscribers to be serviced on a full-selective ringing basis. Additional subscribers, up to a maximum of four, may be added to the same multiparty line 28, with service then being on a semiselective ringing basis.

For voice-frequency signals originating with one of the subscribers on voice line 28, pole-mounted outlying terminal 27 transmits its own modulated carrier wave back towards the central office, where it is demodulated and reconverted to voice by its associated office terminal 11.

To the right of filter 24 in the illustrated example of a rural telephone system featuring the invention, carrier line 14 is connected to a second pole-mounted outlying or satellite carrier terminal 33. Outlying terminal 33 is similar to the first outlying terminal 27 and is adapted both to demodulate to voice frequencies the carrier wave transmitted by its respective office terminal 12 and to convert to carrier and transmit the central office terminal 12 for demodulation the voice-frequency signals originating on its respective multiparty line. Other carrier frequencies are bypassed around outlying terminal 33 by a high-pass filter 34.

In accordance with a feature of the present invention, the demodulated signals from outlying terminal 33 are reinserted on carrier line 14 by a low-pass filter 35 for distribution to subscribers directly from the carrier line. The subscribers 36, 37, and 38 who are associated with outlying carrier terminal 33 may, for example, be located at intervals along the path of the highway followed by carrier line 14. Satellite terminal 33 is mounted on a telephone pole relatively closer to the central office than the subscribers whom it serves. This feature of the invention eliminates any necessity of providing a separate voice-frequency transmission line along the section of the highway past these subscribers in parallel with carrier line 14. A low-pass filter 39, opaque to carrier frequencies, is connected in series in the drop wire coupling carrier line 14 to subscriber 36, and similar low-pass filters 40 and 41 are connected between carrier line 14 and subscribers 37 and 38, respectively.

A third pole-mounted outlying or satellite carrier terminal 42, associated operationally with central office carrier terminal 13, is provided, by way of further example, at the right-hand end of carrier line 14 and couples the signals transmitted by office terminal 13 to its respective multiparty voice line 43. Subscribers 44, 45, 46, and 47 may, for example, be located at intervals along another side road which intersects the highway followed by carrier line 14. Satellite terminal 42 is mounted on a pole at or near the intersection, and voice line 43 is located along the side of the cross-road. The various subscriber telephone sets are connected by drop wires directly to voice line 43.

In the rural carrier telephone system illustrated in Fig. 1, three two-way carrier channels are shown by way of example. It is to be understood, of course, that either a greater or a lesser number may be used in addition to the initial voice-frequency channel, depending upon the service requirements of the area services. Two different carrier-frequency allocations for the system of Fig. 1 are given in Fig. 1A, where each arrow pointing up represents a carrier frequency for transmission from an office terminal to an outlying or satellite terminal, and each arrow pointing down represents a carrier frequency for transmission from an outlying terminal to an office terminal. In both of the specific arrangements represented in Fig. 1A, the lowest carrier frequency employed is 12 kilocycles, and the others are all harmonics of this basic frequency.

In the "grouped" carrier-frequency arrangement represented at the top of Fig. 1A, the low carrier frequencies are all used for transmission in one direction, and the high carrier frequencies are all used for transmission in the other direction. Such an arrangement is advantageous when the carrier line is used approximately to its maximum capacity at the time of installation (in general, this will entail the use of more than three carrier channels) because of relatively low filter costs. It is also advantageous when, as in the embodiment of the invention illustrated in Fig. 1, repeaters are used in any portion of the carrier line. With the grouped arrangement, only one amplifier need be provided in each repeater for each direction of transmission. With the grouped frequency allocations shown in Fig. 1A, 36 and 72 kilocycles are assigned to the first carrier channel, 24 and 60 to the second, and 12 and 48 to the third. Because of the tendency of line attenuation to increase with frequency, the highest frequency combination is used in the shortest carrier channel and the lowest frequency combination in the longest carrier channel.

In the "stacked" frequency arrangement shown at the bottom of Fig. 1A, alternate carrier frequencies are used for transmission in opposite directions. Such an arrangement is most advantageous when the carrier line is initially used to less than its maximum capacity (e.g., with only one or two channels), since it allows room for future expansion without leaving intermediate carrier frequencies unused in the meantime. While the filters required are more selective and hence somewhat more expensive than those required for a grouped arrangement, the stacked arrangement tends to be more versatile. If, for example, only a pair of carrier channels were needed initially, carrier frequencies of 36 and 48 kilocycles would be used for the first channel and carrier frequencies of 12 and 24 kilocycles for the second. Then, when demand increases and additional channels become necessary, carrier frequencies of 60 and 72 kilocycles and above will be available for their use. In the meantime, the two existing carrier channels make use of the lowest possible carrier frequencies, and possible problems of increased line attenuation at higher frequencies are avoided.

*Office carrier terminal—Fig. 2*

An office terminal of the type used in the embodiment of the invention shown in block diagram form in Fig. 1 is illustrated in Fig. 2. In the upper left-hand corner of Fig. 2, the central office voice line 51 is shown coupled across a transformer 52. The two sides of voice line 51 are labelled R and T, respectively, to represent the sides of the line connected to the "ring" and "tip," respectively, of the jack on the operator's phones.

In the central office, the equipment connected to voice line 51 is the same as it would be if voice line 51 were merely the usual telephone transmission line connecting the central office to an individual subscriber or group of multiparty-line subscribers. The central office contains the usual switching equipment and ringing signal generating devices, and the signals applied to voice line 51 in Fig. 2 are standard in every respect.

Voice line 51 in Fig. 2 is connected across the divided primary winding 53 of the transformer 52 with its R side connected to one end of the winding and its T side to the other. The inner adjacent ends of divided primary winding 53 are connected to a ringing signal coding circuit and to the contacts of a signalling relay, both of which will be described later.

The secondary winding 54 of transformer 53 supplies voice-frequency signals through a continuation of line 51 to a compressor 55. Compressor 55 is part of a compandor arrangement provided to improve the signal-to-noise ratio of the transmitted intelligence and will be described later. A condenser 56 is connected between one end of winding 54 and a series resistor 57 to block the low-frequency components of lightning transients and to block induced power currents, and another series resistor 58 is connected between resistor 57 and the input side of compressor 55. The other side of winding 54 is grounded. A bypass condenser 59 is returned to ground from the junction between blocking condenser 56 and series resistor 57 to prevent high-frequency transients from reaching compressor 55, and a shunt resistor 60 is returned to ground from the junction between series resistors 57 and 58.

To provide high voltage protection for the circuits to their right, a pair of oppositely poled silicon p-n junction diodes 61 and 62 are connected in series between ground and the junction between resistor 58 and the appropriate side of compressor 55 and cooperate with the resistance pad formed by resistors 57, 58, and 60. For details about the operation of this protection circuit, which is an important feature of the transistor rural carrier telephone systems disclosed herein, reference is made to application Serial No. 425,283, filed April 23, 1954, by D. W. Bodle and J. B. Hays, Jr. (United States Patent 2,789,254, issued April 16, 1957).

The voice-frequency output from compressor 55 is supplied directly to a modulator 65. Carrier is supplied to modulator 65 by an oscillator 66, while the carrier-frequency output from modulator 65 is supplied on a double sideband plus carrier basis to a transmitting amplifier 67. A band-pass channel filter 68, adapted to pass this double sideband plus carrier signal, is connected to the output side of transmitting amplifier 67.

A modulator suitable for use as modulator 65 in Fig. 2 forms the basis for copending application Serial No. 456,740, filed September 17, 1954, by V. J. Hawks, while an oscillator suitable for use as carrier oscillator 66 is shown in copending application Serial No. 456,661, filed September 17, 1954, by E. K. Van Tassel and R. E. Yaeger.

The output from channel filter 68 is supplied to the carrier line 14 through a carrier line transformer 69. A bypass condenser 70 is connected across the primary winding 71 of transformer 69 to attenuate incoming high-frequency transients, and a series resistance 72 is connected in one side of the carrier line continuation between one side of winding 71 and the appropriate output terminal of band-pass channel filter 68. The other output terminal of filter 68 is connected directly to ground and the other side of winding 71. A blocking condenser 73 is connected in series between the two halves of the divided secondary winding 74 of line transformer 69 to prevent power induction and low-frequency components of lightning surges from reaching the office terminal equipment from carrier line 14, while the extreme ends of winding 74 are connected directly to the respective R and T sides of carrier line 14.

For primary high voltage protection, a pair of carbon block protectors 75 and 76 are connected between respective sides of carrier line 14 and ground. For secondary high voltage protection, a pair of oppositely poled silicon p-n junction diodes 77 and 78 are connected in series across the output side of channel filter 68 (between the terminal side of resistor 72 and ground). Details of the high voltage protection given by diodes 77 and 78 in conjunction with carbon block protectors 75 and 76 and series resistor 72 are given in the copending application by Bodle and Hays which has already been identified. The high voltage protection arrangement formed by carbon block protectors 75 and 76, diodes 77 and 78, and series resistor 72 makes feasible, in a sense, the use of transistors in a carrier telephone transmission system. Whereas vacuum tubes will generally stand very large surges of applied voltage, transistors will not, and some sort of protective arrangement is necessary if the latter are to avoid damage from lightning surges and power induction. Although neither the carbon block protectors nor the avalanche breakdown diodes currently available at reasonable cost and in commercial quantities are adequate to provide the necessary protection, the illustrated arrangement is and makes possible the advantages of a fully transistorized system.

Incoming voice-modulated carrier signals from the associated outlying carrier terminal are transmitted from carrier line 14 to office voice line 51 through an appropriate band-pass channel filter 81, a receiving amplifier 82, a demodulator 83, and an expandor 84. Channel filter 81 has its input terminals connected in parallel with the output terminals of outgoing channel filter 68. Expandor 84 is part of the compandor for the carrier channel directed toward the office and serves to restore the volume range of the demodulated signals to that possessed by the signals prior to transmission to the office terminal. Expandor 84, receiving amplifier 82, and demodulator 83 will be described later in more detail.

A bridge circuit composed of three resistors 85, 86, and 87 and the impedance of voice line 51 (as seen from the resistance bridge) is provided to separate the input side of compressor 55 from the output side of expandor 84. Resistors 86 and 87 are connected in series across the input of compressor 55, and resistor 85 is connected between resistor 86 and ground. The output side of expandor 84 is connected across the series combination of resistors 85 and 86 through a resistance pad composed of a pair of series resistors 88 and 89 and a shunt resistor 90. The bridge terminals leading to compressor 55 are conjugate to those leading to expandor 84, with the result that signals are not transmitted from one to the other. Since voice line 51 forms only one arm of the four-terminal bridge, it is coupled effectively to both compressor 55 and expandor 84.

In accordance with a feature of the invention, ringing information generated at the central office and impressed upon voice line 51 in the form of 20-cycle voltages superimposed upon either positive or negative D.-C. voltages between ground and either the T or R sides of the line is coded for transmission over carrier line 14 by a coding circuit coupled between the two halves of primary winding 53 of voice line transformer 52. The T side of voice line 51 is connected through half of winding 53 to the armature of a fast-acting relay 96. The front contact of relay 96 is connected through the other half of winding 53 to the R side of voice line 51, while the back contact is connected through a low-pass filter 97 to a switch 98. A pair of resistors 99 and 100 are connected in series between the two halves of primary winding 53, and a D.-C. blocking condenser 101 is connected from the common point between resistors 99 and 100 to a second switch 102. The two inner ends of divided winding 53 are also connected through a low-pass filter 103 to a third switch 104.

Sources of three separate voice-frequency tones $f_1$, $f_2$, and $f_3$ are connected to switches 102, 98, and 104, respectively. Switch 102 passes tone $f_1$ only in the presence of a signal from the path which includes blocking condenser 101, and switch 98 passes tone $f_2$ only in the presence of a signal from low-pass filter 97. Switch 104 passes tone $f_3$ only if the T side of voice line 51 has a particular D.-C. polarity with respect to the R side (e.g., T is negative with respect to R). The outputs of switches 102, 98, and 104 are all coupled to the input side of a common amplifier 105, the output side of which is coupled to the signal input circuit of modulator 65.

The output side of receiving amplifier 82 is connected through an amplifier 106 and a detector 107 to the operating coil of relay 96 for purposes which will be explained later.

More complete details of the office carrier terminal illustrated in Fig. 2 are given in copending application Serial No. 455,129, filed the same date as the present application by D. C. Weller for a "Telephone Ringing-Signal Transmission System," (United States Patent 2,763,726, issued Sept. 18, 1956).

*Outlying carrier terminal—Figs. 3A and 3B*

Figs. 3A and 3B, taken together, illustrate one of the pole-mounted outlying or satellite terminals shown in block diagram form in the embodiment of the invention illustrated in Fig. 1. For a complete representation of the terminal, Fig. 3A should be placed immediately to the left of Fig. 3B with the leads ending at the right-hand side of Fig. 3A connected with those beginning at the left-hand side of Fig. 3B.

At the left-hand side of Fig. 3A, the connections to the carrier line 14 are substantially the same as those from the office terminal in Fig. 2. A pair of carbon block protectors 111 and 112 are connected between respective sides of carrier line 14 and ground. The divided primary winding 113 of a carrier line transformer 114 is connected across carrier line 14 to the right of carbon block protectors 111 and 112, with a blocking condenser 115 connected in series relation between its two halves. A high-frequency bypass condenser 116 is connected across the secondary winding 117 of line transformer 114, and a resistor 118 is connected in series with the R side of the line to the right of secondary winding 117. To the right of series resistor 118, the carrier line is connected to the input side of a band-pass channel filter 119.

A pair of oppositely poled silicon p–n junction diodes 120 and 121 are connected in series across the input side of channel filter 119. Along with carbon block protectors 111 and 112 and resistor 118, these diodes operate to provide protection from sudden surges of voltage on carrier line 14 in the same manner as to corresponding elements in the office carrier terminal illustrated in Fig. 2.

From channel filter 119, the incoming carrier frequencies are supplied through a receiving amplifier 124 to a demodulator 125 which restores the incoming signals to the voice band. The output side of demodulator 125 is connected to an expandor 126. Receiving amplifier 124, demodulator 125, and expandor 126 are like corresponding elements in Fig. 2 and will be described in detail later.

One terminal on the output side of expandor 126 (that associated with the T side of the carrier and voice lines) is grounded, while the other is connected to the back contact and one of the three front contacts of a slow-acting supervisory relay 127 in Fig. 3B. Supervisory relay 127 is a four-armature relay having single front contacts associated with three of its arms and a single back contact associated with the remaining arm.

When its operating coil is energized, relay 127 connects the output side of expandor 126 to a resistance pad made up of a pair of series resistors 128 and 129 and a shunt resistor 130. The other side of this resistance pad is connected across a pair of series resistors 131 and 132. With a resistor 133 and the impedance of the voice line, these resistors 131 and 132 make up a bridge like that separating the incoming and outgoing voice paths in Fig. 2.

The side of bridge resistor 131 connected to shunt pad resistor 130 is grounded, while the side of resistor 132 connected to series pad resistor 128 is connected to the third bridge resistor 133. A pair of oppositely poled silicon p–n junction diode high-voltage protectors 134 and 135 are connected between the end of resistor 133 remote from resistance 132 and ground (across the arm of the bridge formed by the outlying terminal voice line). A resistance pad composed of a pair of series resistors 138 and 139 and a shunt resistor 140 is connected between the protector diodes and the primary winding 141 of a voice line transformer 142. Winding 141 is shunted by a high-frequency bypass condenser 143.

Line transformer 142 is provided with a divided secondary winding 175 corresponding to winding 51 of voice line transformer 52 in Fig. 2, the opposite ends of which are connected through the back contacts of a slow-acting ringing relay 144 to the subscriber voice line 145. Relay 144 is a two-armature relay having separate forward and back contacts for each arm. As in Fig. 2, one side of the voice line is labelled R while the other side is labelled T.

Resistors 131, 132, and 133 form, with the outlying terminal voice line 145, a bridge circuit serving to separate incoming and outgoing signals. A compressor 146 has its input terminals connected, respectively, to the side of resistance 133 remote from resistance 132 and to the junction between resistances 131 and 132. The output side of compressor 146 is connected to a modulator 147, which is supplied with carrier by an oscillator 148. The output side of modulator 147 is connected through a transmitting amplifier 149 and a band-pass outgoing channel filter 150 to the carrier line 14. The output terminals of filter 150 are in parallel with the input terminals of incoming channel filter 119. Compressor 146, modulator 147, oscillator 148, and transmitting amplifier 149 are the same as compressor 55, modulator 65, oscillator 66, and amplifier 67 in the office terminal illustrated in Fig. 2.

Compressor 55 in Fig. 2 and expandor 126 in Fig. 3A cooperate to form a compandor which will be described in connection with Figs. 4A and 4B. This compandor is operative for transmission from the office terminal to the outlying terminal. Band-pass channel filters 68 and 119 are adapted to pass the same frequency bands for the purpose of accommodating this direction of transmission. Compressor 146 and expandor 84 cooperate to form another like compandor operative for transmission from the outlying carrier terminal to the office terminal. Channel filters 81 and 150 are arranged to pass the carrier frequencies used for transmission in this direction.

For ringing purposes, the armature of supervisory relay 127 in Fig. 3B associated with the single back contact is connected to each of three like amplifiers 155, 156, and 157. The output side of amplifier 155 is connected through a band-pass filter 158 and a detector 159 to the operating coil of a fast-acting relay 160. The output side of amplifier 156 is connected through a band-pass filter 161 and a detector 162 to the operating coil of a second similar fast-acting relay 163. The output side of amplifier 157 is connected through a band-pass filter 164 and a detector 165 to the operating coil of still a third fast-acting relay 166. Band-pass filters 158, 161, and 164 are adapted to pass the voice-frequency tones $f_1$, $f_2$, and $f_3$, respectively.

Relays 160, 163, and 166 are all fast-operating single-armature relays with both front and back contacts. The back contact of relay 160 is connected to one side of the operating coil of ringing relay 144, while the armature of relay 160 is connected to the other side of that coil. The front contact of relay 160 is connected through a low-pass filter 167 to the negative terminal of a D.-C. supply source 168. The positive terminal of source 168 is grounded.

In the unoperated condition of ringing relay 144, its armatures and the respective back contacts connect the R and T sides of subscriber voice line 145 directly to the opposite sides of the secondary winding 175 of voice line transformer 142. When relay 144 is operated, its front contacts connect the R and T sides of voice line 145 directly to the front and back contacts, repectively, of relay 163. The armature of relay 163 is grounded. The primary winding 169 of a 20-cycle ringing current transformer 170 is connected between the front contact of relay 144 on the R side of the line and a pair of oppositely poled rectifiers 171 and 172. Rectifier 171 is connected between winding 169 and the front contact of relay 166, while rectifier 172 is connected between winding 169 and the back contact of that same relay. The armature of relay 166 is connected to the front contact of relay 144 on the T side of the line. The secondary winding 173 of ringing current transformer 170 and a condenser 174 are connected in series between the back contact and armature of relay 160 (i.e., directly across the operating coil of ringing relay 144). The back contact of relay 160 is also connected through low-pass filter 167 to ground. A small condenser 176 is connected directly across the primary winding 169 of ringing current transformer 170 to reduce the effects of switching transients from relay 166.

The ends of divided secondary winding 175 of transformer 142 remote from voice line 145 are connected to opposite sides of a condenser 178. A fast-acting pulse repeating relay 179 is provided with two operating coils, one of which is connected from the side of condenser 178 associated with the R side of voice line 145 to the negative terminal of a D.-C. supply source 180 and the other of which is connected between the side of condenser 178 associated with the T side of voice line 145 and ground. Relay 179 has a single armature with both front and back contacts. The armature of relay 179 is grounded, its front contact is connected through the operating coil of slow-acting supervisory relay 127 to the negative terminal of D.-C. supply source 180, and its back contact is connected to the input side of transmitting amplifier 149.

As stated previously, supervisory relay 127 is provided with four armatures, each with a single associated contact. From top to bottom, the first armature has an associated front contact, the second a front contact, the third a back contact, and the fourth a front contact. The first armature of supervisory relay 127 and its front contact are connected in series with the carrier line between the output side of transmitting amplifier 149 and the input line of outgoing channel filter 150. The second armature serves, through its front contact, to connect expandor 126 through the bridge made up of resistors 131, 132, and 133 to voice line 145, while the third armature serves, through its back contact, to connect expandor 126 to amplifiers 155, 156, and 157. The fourth armature of relay 127 is grounded, and its associated front contact is connected to the respective ground leads of compressor 146, transmitting amplifier 149, and carrier oscillator 148.

More complete circuit details regarding the outlying carrier terminal shown in Figs. 3A and 3B may be obtained from the previously identified copending application of D. C. Weller.

*Voice-frequency compandor—Figs. 4A and 4B*

Figs. 4A and 4B illustrate the compandor used in the office and outlying carrier terminals of Figs. 2, 3A, and 3B. Fig. 4A shows a compressor suitable for use as either compressor 55 of Fig. 2 or compressor 146 of Fig.

3A, while Fig. 4B illustrates an expandor suitable for use as either expandor 126 of Fig. 3A or expandor 84 of Fig. 2.

On the input side of the compressor shown in Fig. 4A, the voice line (from the impedance bridge separating the compressor and expandor paths in either Fig. 2 or Fig. 3B) is connected to the primary winding 190 of a first voice line transformer 191. Transformer 191 is provided with a divided secondary winding 192, the two portions of which are connected in series across the primary winding 193 of a second voice line transformer 194. A pair of silicon alloy junction diodes 195 and 196 are connected in series across winding 193 to form a variolosser with each diode poled for easy current flow in the direction toward their common point.

The A.-C. impedances of diodes 195 and 196 vary substantially linearly over a wide range with the D.-C. control current flowing through them, with the result that they provide substantially an open-circuit across the voice line with small control currents and a low impedance path across the line with large control currents. D.-C. control currents are provided by connections to the mid-point of divided secondary winding 192 which is grounded and the common point between diodes 195 and 196.

The secondary winding 197 of transformer 194 is coupled to the input side of a transistor feedback amplifier 198 which is substantially the same as that shown in Fig. 2 of copending application Serial No. 409,684, filed February 11, 1954, by R. E. Yaeger (United States Patent 2,844,667, issued July 22, 1958). The output side of amplifier 198 is connected to the primary winding 199 of a hybrid coil 200. The secondary side of hybrid coil 200 is composed of two windings 201 and 202 with a balancing resistor 203 connected to their common point. The free ends of winding 201 and resistor 203 are connected to the following modulator in whichever carrier terminal the compressor is used, while the free end of winding 202 and the same free end of resistor 203 are connected to the input side of a compressor control amplifier 204. Amplifier 204 is substantially the same as transistor amplifier 198 in the main outgoing signal path.

In the compressor control path, the output side of amplifier 204 is connected to the primary winding 205 of a transformer 206. Transformer 206 has a series-connected divided secondary winding 207, and a pair of silicon alloy junction diodes 208 and 209 are connected in series across the two parts. Diodes 208 and 209 are arranged to form a full-wave rectifier, and each diode is poled for easy current flow towards its respective end of winding 207. The common point between diodes 208 and 209 is connected through a resistor 210 to the common point between variolosser diodes 195 and 196.

An audio-frequency bypass condenser 211 is connected from the common point between rectifier diodes 208 and 209 to the mid-point of secondary winding 207 to remove voice-frequency components from the control signal applied to the compressor variolosser. Since the silicon alloy junction diodes 208 and 209 do not conduct unless the applied voltage in the forward direction is of the order of about half a volt in magnitude, a permanent forward D.-C. bias of that magnitude is provided in order to insure rectifier linearity. A large variable bleeder resistor 212 is returned to the negative side of a D.-C. supply source 213 from the mid-point of winding 207. The positive side of source 213 is grounded, and the required bias is provided by a resistor 214 bypassed by a condenser 215 connected from the mid-point of coil 207 to ground. Variable resistor 212 permits easy adjustment of the rectifier bias. D.-C. source 212 may, and generally is, also the power supply for amplifiers 198 and 204.

The compressor illustrated in Fig. 4A operates in the usual manner to reduce the volume range of the voice-frequency signals applied to its input terminals in order to improve the signal-to-noise ratio of the signals received at the other end of the carrier channel. The silicon alloy junction diodes used in the variolosser are advantageous not only in that they have a larger change in loss per stage of variable resistance than other available types of diodes but also in that their characteristics are generally not subject to wide variation with temperature. This latter advantage is particularly important in the rural carrier telephone system like that illustrated in Fig. 1, since the outlying carrier terminals at least are generally pole-mounted and thereby subject to wide variations in ambient temperature. Use of such diodes in the variolossers in both compressors and expandors enables the compressors and expandors to track one another to a satisfactory degree over an extremely wide temperature range. Similar diodes are used as rectifying elements in the backward-acting control path in order to achieve this same advantage with respect to temperature performance.

In the operation of the compressor illustrated in Fig. 4A, hybrid coil 200 serves effectively to isolate the signal path from the control path and prevent impedance variations in one from affecting the performance of the other. The modulator faced by winding 201 generally presents a varying impedance to the compressor. Use of hybrid coil 200 in the manner described prevents these changes from affecting the transmission to the control path amplifier 204 and, thereby, the accuracy of the compression action of the variolosser.

The expandor illustrated in Fig. 4B complements the compressor which has just been described in that it restores the volume range of the received signals either at the office terminal or at the outlying terminal to its original level. In Fig. 4B, the expandor receives voice-frequency signals (from demodulator 125 in Fig. 3A or from demodulator 83 in Fig. 2) through the primary winding 220 of a hybrid coil 221. Hybrid coil 221 is generally similar to hybrid coil 200 in Fig. 4A and includes two windings 222 and 223 on its secondary side. One side of the balancing resistor 224 is connected to the common point between windings 222 and 223. The primary winding 225 of a voice line transformer 226 is connected between the free ends of windings 222 and resistor 224, while the free end of winding 223 and the same free end of resistor 224 are connected to the input side of the expandor control amplifier 227. Amplifier 227 is similar to amplifiers 198 and 204 in Fig. 4A and is a transistor amplifier substantially the same as that shown in Fig. 2 of the above-identified application of R. E. Yaeger.

The secondary winding 228 of transformer 226 cooperates with the primary winding 229 of a second voice line transformer 230 and a pair of silicon alloy junction diodes 231 and 232 to form the expandor variolosser. The variolosser diodes in Fig. 4B differ from those in Fig. 4A in that they are connected in series with rather than in shunt across the voice line. Diode 231 is connected between one end of winding 228 and the corresponding end of winding 229, while diode 232 is connected between the other ends of the two windings. Both diodes are poled for easy current flow toward winding 228. Both windings are center-tapped for application of the D.-C. control signal, the mid-point of winding 229 being grounded.

Since in Fig. 4B the variolosser diodes are connected in series with the voice line, their operation is just the reverse of those in Fig. 4A and gives the required expansion characteristic. For small D.-C. control signals, the A.-C. resistance of the diodes is small and the loss introduced into the transmission path is small. For large D.-C. control signals, the diode A.-C. resistance is large and the voice line loss is correspondingly increased.

The voice-frequency signal path in Fig. 4B continues on to the secondary winding 233 of transformer 230 which is connected to the input side of a transistor feedback amplifier 234. Amplifier 234 is substantially the same as amplifier 227, and its output terminals are connected to the primary winding 235 of a third voice line transformer 236. The secondary winding 237 of transformer 236 is coupled to a voice line for appropriate utilization (i.e., to the respective resistance bridges in the carrier terminals in Figs. 2 and 3B).

The expandor control path in Fig. 4B differs from the compressor control path in Fig. 4A in that it is forward acting rather than backward acting. Otherwise, it is essentially the same. The output side of transistor amplifier 227 is connected to the primary winding 238 of a control circuit transformer 239. The secondary winding 240 of transformer 239 is center-tapped, and a pair of silicon alloy junction diodes 241 and 242 are connected in series between opposite ends of the winding. Diodes 241 and 242 form a full-wave rectifier and are poled for easy current flow in the direction of the respective ends of winding 240 to which they are connected. This common point is connected through a resistance 243 to supply control current to the mid-point of winding 228 in the variolosser circuit.

Voice-frequency components are removed from the output of the control rectifier in Fig. 4B by condenser 244 connected between the mid-point of winding 240 and the common point of diodes 241 and 242. Diodes 241 and 242, having the characteristic of not conducting at forward voltages of less than about half a volt, are provided with a permanent forward bias. A variable bleeder resistor 245 is connected to the negative terminal of a D.-C. supply source 246 from the mid-point of winding 240. The positive terminal of source 246 (which may also supply power to amplifiers 227 and 234) is grounded, and a resistor 247 is returned to ground from the mid-point of winding 240. Resistor 247 is bypassed to ground at voice frequencies by a condenser 248.

The expandor illustrated in Fig. 4B operates in the usual manner to restore the signals compressed by the circuit of Fig. 4A to their original level. Hybrid coil 221 separates the signal path from the control path in order to make the control path independent of variolosser impedance variations. The transmission loss of the circuit is controlled by the control circuit variolosser combination and is high for small control signals and low for large control signals. The control signal level is in turn governed directly by the level of the voice-frequency signals received at the expandor input.

*Receiving amplifier-demodulator—Fig. 5*

Fig. 5 illustrates the receiving amplifier-demodulator used in the office and outlying carrier terminals shown in Figs. 2 and 3A. In each instance, the receiving amplifier receives incoming carrier-frequency signals from the appropriate channel filter, and the demodulator delivers the demodulated voice-frequency signals to the following expandor. The gain of the receiving amplifier shown in Fig. 5 is regulated in order to provide substantial constant output for all incoming signals within a predetermined usable range and level.

The receiving amplifier-demodulator illustrated in Fig. 5 has input connections which include a resistance pad composed of a series resistor 260 and a pair of shunt resistors 261 and 262 arranged in a $\pi$ network. The primary winding 263 of a transformer 264 is connected across the second shunt resistor 262. Across the secondary winding 265 of transformer 264 are connected a pair of silicon alloy junction diodes 266 and 267 in series. Diodes 266 and 267 are poled for easy current flow toward their common point from the respective ends of winding 265 and form a variolosser generally similar to that used in the compressor illustrated in Fig. 4A. The primary winding 268 of a second transformer 269 is also connected across winding 265, and a bypass condenser 270 is connected from the mid-point of winding 268 to the common point between diodes 266 and 267. The variolosser maintains substantially constant output from the receiving amplifier for input signals above a level determined by the characteristics of the variolosser diodes 266 and 267 and resistance pad made up of resistors 260, 261, and 262. The level of the demodulated signals applied from the receiving amplifier-demodulator to the following expandor is thereby held constant in the presence of a received signal.

The secondary winding 271 of transformer 269 is coupled directly to the input side of a transistor feedback amplifier 272 while the output side of amplifier 272 is connected to the primary winding 273 of transformer 274. The secondary winding 275 of transformer 274 is coupled through a demodulator composed of diodes 276, 277, 278, and 279 to an output low-pass filter 280. The output side of filter 280 is connected to the expandor illustrated in Fig. 4B.

The demodulator is of the well-known full-wave rectifier type making use of four diodes arranged in a lattice-type network as shown. Diodes 276 and 277 are oppositely poled and form the series arms of the lattice, while diodes 278 and 279 are oppositely poled and form the cross arms.

The regulating circuit in Fig. 5 is backward acting. Gain is supplied by a transistor amplifier 281, the input side of which is connected across winding 275 at the demodulator input. The primary winding 282 of a control circuit transformer 283 is connected across the output side of amplifier 281. The secondary winding 284 of transformer 283 is connected to a full-wave rectifier made up of diodes 285, 286, 287, and 288. This rectifier is substantially the same as the demodulator in that diodes 285 and 286 are oppositely poled and form the series arms of a four-terminal lattice network, while diodes 287 and 288 are oppositely poled and form the cross arms. A resistor 289 and a pypass condenser 290 are connected in parallel across the output terminals of the rectifier. One side of resistor 289 is grounded.

The rectified control current from amplifier 281 is applied to the variolosser in the input circuit of main receiving amplifier 272. The ungrounded side of resistor 289 is connected directly to the mid-point of the primary winding 268 of transformer 269, while the mid-point between variolosser diodes 266 and 267 is connected to the movable contact point of a potentiometer 291. One side of the resistance arm of potentiometer 291 is returned to ground to complete the control path.

In order to increase the gain of the control path and hence the sensitivity of the regulating action, a D.-C. bias is provided in the connection between diodes 266 and 267 and ground. A silicon junction diode 292 is connected in parallel with the resistance arm of potentiometer 291 and is poled with its forward conducting direction toward ground. A D.-C. supply source 293 (which is, in general, the supply source for amplifiers 272 and 281) is connected in series with a dropping resistor 294 across diode 292 with source 293 poled to provide a negative potential at the ungrounded ends of diode 292 and the resistance arm of potentiometer 291.

Diode 292 is chosen so that its avalanche breakdown characteristic limits the D.-C. bias voltage applied to the control rectifier to the desired level. Potentiometer 291 permits fine adjustment of the bias in the event that the particular diode used does not have the exact avalanche breakdown voltage required to provide the optimum bias.

In operation, the receiving amplifier illustrated in Fig. 5 provides substantially a constant output level for all input signal levels within a predetermined range. This action makes up for any transmission irregularities in the incoming carrier line and insures proper operation of the other receiving apparatus in the carrier terminal. False operation for incoming voltages below the predetermined range of input level is avoided through the presence of the resistance network composed of resistors 260, 261, and 262. As the control signal fed back through the regulator circuit approaches zero in value, the impedance across the line provided by diodes 266 and 267 becomes very large and the loss introduced by the variolosser approaches zero. The resistor network, however, introduces a fixed loss which then becomes the dominating factor.

*Operation of office and outlying terminals—Figs. 2, 3A, and 3B*

The detailed operation of the office and outlying carrier terminals illustrated in Figs. 2, 3A, and 3B may best be set forth by describing the progress first of a call from the central office to a subscriber and second of a call from the subscriber to the central office. The call from the office to the subscriber will, of course, generally originate at another subscriber's set, but the effect on the apparatus illustrated is the same regardless of where it originated.

*Call from central office to subscriber*

Prior to the call, no signal other than supervisory battery is applied to voice line 51 in the office terminal, and the subscriber's set on voice line 145 leading from the outlying terminal remains in its on-hook condition, providing substantially an open-circuit across voice line 145. A call is originated at the office terminal by the application of office-generated ringing signals to voice line 51. The apparatus illustrated in Figs. 2, 3A, and 3B provides full-selective ringing (i.e., ringing heard only by the party called) on a four-party line and semiselective ringing (i.e., ringing heard only by the party called and one other party) on an eight-party line. For this type of ringing, a 20-cycle ringing signal superimposed upon D.-C. is applied between one side of voice line 51 and ground. The four different ringing signal combinations possible are a positive signal between the R side of the line and ground, a negative signal between the R side of the line and ground, a positive signal between the T side of the line and ground, and a negative signal between the T side of the line and ground. When two subscribers are designated by the same ringing potential at voice line 51, a different ringing code is used for each party. Thus, in an eight-party semiselective system, one long ring could be used to signal one of the parties designated by each of the four ringing potential arrangements, and two short rings could be used to signal the other.

In accordance with a principal feature of the present invention, any necessity of transmitting the superimposed 20-cycle ringing information appearing on voice line 51 over carrier line 14 to the outlying terminal is avoided by coding the ringing information in terms of the presence or absence of a plurality of tones in the voice band. In the terminals shown in Figs. 2, 3A, and 3B, three tones, designated as $f_1$, $f_2$, and $f_3$, respectively, are used. In the particular arrangement illustrated, the presence of tone $f_1$ in the voice-frequency parts of the system signifies that ringing is to take place, while the presence or absence of tones $f_2$ and $f_3$ indicates which party or pair of parties is to be rung.

Fig. 6A is a chart setting forth the ringing code used by the carrier terminals illustrated in Figs. 2, 3A, and 3B. A check mark in a tone column indicates the presence of the particular tone in each instance.

Fig. 6B illustrates the wave-forms of the ringing voltages supplied by the standard central office equipment to the office terminal of Fig. 2. In a four-party full-selective system (e.g., that servicing subscribers A, B, C, and D in Fig. 1), each party is rung by a different one of the four available ringing signal combinations. Reading from left to right in Fig. 6B, the wave-forms shown are supplied to the office terminal (voice line 51 in Fig. 2) to ring parties A, B, C, and D, respectively. While only a few cycles of each ringing voltage are shown, it is to be understood that a typical ring includes a much larger number of cycles.

Fig. 6C illustrates the voice-frequency tones transmitted, in accordance with a feature of the invention, to modulator 65 from amplifier 105 in Fig. 2. These tones are, in turn, used to modulate the outgoing carrier and convey the appropriate ringing information to the outlying terminal.

Fig. 6D shows the ringing voltage wave-forms recreated from the various received ringing signal voice tones at the outlying terminal disclosed in Figs. 3A and 3B.

Using the ringing code given in Fig. 6A, when party A is to be rung, the ringing signal originated at the central office appears on the R side of voice line 51 in Fig. 2 as a 20-cycle signal superimposed upon a positive direct voltage, as shown in the first column of Fig. 6B. The ringing signal then appears as a voltage to ground across resistance 99 and condenser 101 in Fig. 2. The D.-C. component of the ringing signal is blocked by condenser 101, and switch 102 closes on alternate half-cycles (e.g., negative half-cycles) of the 20-cycle ringing voltage, permitting voice-frequency tone $f_1$ to flow into the input of amplifier 105 during those intervals. Switch 102 in other words, serves as a detector for the A.-C. ringing signal on voice line 51 and applies bursts of the tone $f_1$ to the input of amplifiers 105 when the A.-C. ringing signal is present. These bursts of the tone $f_1$ are shown in Fig. 6C.

When a positive ringing signal appears on the R side of line 51, no signal is applied to switch 98, since the latter is affiliated only with the T side of the line. The tone $f_2$ is not, therefore, applied to amplifier 105. The ringing signal is, however, applied through low-pass filter 103 to switch 104. Filter 103 removes the A.-C. component of the ringing signal, and switch 104 is arranged to pass tone $f_3$ whenever a predetermined D.-C. polarity exists between the R and T sides of line 51. If it is assumed (as it is with the code of Fig. 6A) that switch 104 passes frequency $f_3$ to amplifier 105 when T is negative with respect to R, a positive ringing signal on R causes tones $f_1$ and $f_3$ to be passed through amplifier 105 to the input side of modulator 65 for transmission out onto the carrier line 14. As explained above, tone $f_2$ is not present.

When party B is to be rung, a negative ringing signal is applied to the R side of voice line 51. This signal is illustrated in the second column of Fig. 6B. Its D.-C. component is blocked by condenser 101 in the same manner as before, and its 20-cycle component serves to operate switch 102 and transmit bursts of the tone $f_1$ to amplifier 105. Since it is affiliated only with the T side of the line, switch 98 still fails to transmit tone $f_2$. The signal is also passed through low-pass filter 103 to switch 104, but since R is now negative with respect to T, switch 104, under the previously assumed conditions, does not transmit tone $f_3$. Thus, for a negative ringing signal on R, the only tone present and transmitted to the input side of modulator 65 is, as shown in Fig. 6C, that represented by $f_1$.

When party C is to be rung, a positive ringing signal is applied to the T side of voice line 51. Switch 102 is operated in the same manner as before, but the ringing signal is now passed through the armature and back contact of unoperated relay 96 and through low-pass filter 97 to switch 98. Switch 98 operates, permitting tone $f_2$ to flow, as shown in Fig. 6C. The presence of tone $f_2$ thus indicates that a T party is to be rung, while with the ringing signals described previously, its absence indicated that an R party was to be rung. The positive ringing signal on T is also applied to switch 104 through low-pass filter 103. Since switch 104 operates only when T is negative with respect to R, $f_3$ is not passed in this instance.

During talking intervals, it would, of course, be undesirable to have switch 104 operate momentarily to pass the ringing tone $f_3$. In the office terminal shown in Fig. 2, this is prevented by the presence of a D.-C. voltage on voice line 51 of the polarity needed to keep switch 104 turned off. This voltage is from the so-called "talking battery" at the central office and is applied to the voice line to power subscriber set microphones. In Fig. 2, it is used to prevent transmission of ringing tone $f_3$ during talking intervals, and the associated outlying terminal is relied upon to recreate an appropriate talking voltage across the subscriber line.

The final type of ringing signal which the circuits of Figs. 2, 3A, and 3B are arranged to accommodate is the negative ringing signal on the T side of the office terminal of voice line 51 illustrated in the fourth column of Fig. 6B. Such a signal is used when party D is to be rung and operates switch 102 in the usual manner, permitting tone $f_1$ to flow. It also operates both switch 98 and switch 104, permitting tones $f_2$ and $f_3$ to flow. In this manner, a negative ringing signal on T causes all three tones to be applied to amplifier 105 and, hence, modulator 65. The wave-forms applied to modulator 65 in this instance are shown in the fourth column of Fig. 6C.

Regardless of which type of ringing signal is applied to office terminal voice line 51 in Fig. 2, the transmitted tone or tones are applied to the signal input side of modulator 65 and used to modulate the carrier produced by oscillator 66. The resulting carrier frequencies are passed through channel filter 68 out onto carrier line 14.

While the subscriber set is still in its on-hook condition, the carrier-frequency ringing tones transmitted by the office terminal illustrated in Fig. 2 are received at the carrier side of the outlying carrier terminal illustrated in Figs. 3A and 3B. There, they pass through channel filter 119 and receiving amplifier 124 to demodulator 125. The reconstructed voice tones then pass through expandor 126 through the single back contact of supervisory relay 127 to the input sides of the three amplifiers 155, 156, and 157. The band-pass filter on the output side of each amplifier is tuned to a respective one of the voice-frequency tones into which the ringing information is coded.

When tone $f_1$ is present, indicating that a party is to be rung, the output from its detector 159 serves to operate relay 160, thereby connecting the operating coil of voice line relay 144 across D.-C. supply 168 through low-pass filter 167. Relay 160 is a fast-acting relay and, since frequency $f_1$ has been converted into the 20-cycle bursts illustrated in Fig. 6C, operates at a 20-cycle rate. Voice line relay 144 is a slow-release relay which does not operate at a 20-cycle rate but, rather, maintains contact as long as bursts of the frequency $f_1$ are present in amplifier 155 and band-pass filter 158. In other words, slow-release relay 144 operates on a per-ring basis, while fast-operating relay 160 acts on a per-cycle basis.

When tone $f_2$ is present in amplifier 156, it is detected and applied to the operating coil of relay 163. Since the presence of tone $f_2$ indicates that a T party is to be rung, its presence at the operating winding of relay 163 serves to connect the grounded armature of the relay to the opposite or R side of the voice line 145. In the absence of frequency $f_2$, relay 163 serves to ground the T side of line 145.

Presence of tone $f_3$ in amplifier 157 and filter 164 serves to operate relay 166 and connect rectifier 171 in series between the secondary winding of 20-cycle transformer 169 and the T side of voice line 145. Absence of tone $f_3$ leaves rectifier 172 connected in that position instead of rectifier 171.

Thus, in the presence of tone $f_1$, a 20-cycle ringing voltage is generated in the primary winding 173 of 20-cycle transformer 170 and applied by way of relay 144 through secondary winding 169 to either the T or the R side of voice line 145. Presence of frequency $f_2$ determines that the applied ringing potential is to be between the T side of line 145 and ground, while its absence insures that the potential is between the R side of the line and ground. Presence or absence of tone $f_3$ determines the polarity of the D.-C. component of the ringing potential. Wave-forms of the ringing voltages recreated at the outlying carrier terminal illustrated in Figs. 3A and 3B are given in Fig. 6D.

In the manner which has been described, the present invention permits the ringing information initially impressed on voice line 51 in the office terminal of Fig. 2 by appropriate central office equipment to be transferred to the outlying terminal of Figs. 3A and 3B on a carrier-frequency basis. Since it is only the presence or the absence of tones which governs reconstruction of the ringing information at the outlying terminal, the tones need, in accordance with the invention, not be transmitted over the carrier line 14 at a power level any higher than that used for other voice transmission. The full power needed for ringing on the voice line 145 beyond the outlying terminal is obtained from the battery at the pole-mounted terminal and need not be transmitted over the carrier line.

One the called subscriber is rung from the outlying terminal illustrated in Figs. 3A and 3B, the next step occurs when the subscriber answers, changing his set to its off-hook condition. When the subscriber set is in its on-hook condition, a very large impedance is left across the voice line 145 leading from the outlying terminal, as outlined above. Lifting the switch-hook, however, when relay 144 is in its released position between rings places essentially a short-circuit across the line, with the result that only a relatively small impedance is left in the circuit including voice line 145, windings 143 of transformer 142, the operating winding of relay 179, and D.-C. supply source 180. Source 180 then causes current to flow in the operating windings of relay 179. Relay 179 operates, removing the short-circuit from the input terminals of transmitting amplifier 149 and closing a circuit including the operating coil of supervisory relay 127 and D.-C. source 180.

When supervisory relay 127 operates, a number of things happen. In the first place, the connection to amplifiers 155, 156, and 157 from the output of expandor 126 by way of the single back contact on relay 127 is broken. In the second place, the ground connection to compressor 146, transmitting amplifier 149, and carrier oscillator 148 is closed, thus activating these components. In addition, the open-circuit between transmitting amplifier 149 and band-pass channel filter 150 is closed, while the output of expandor 126 is connected to the bridge circuit coupling expandor 126 and compressor 146 to voice line 145.

In this manner, ringing signals are prevented from reaching the subscriber while his subset is in its off-hook condition, relay 144 is locked open, and the transmitting side of the outlying terminal is readied for operation. The system is then ready for two-way voice transmission. In accordance with a feature of the invention, D.-C. supply source 180 remains connected across voice line 145 to power the subscriber set in use on the line.

When the conversation is completed, the subscriber hangs up, restoring his subset to its on-hook condition. A substantially open-circuit is then restored across voice line 145, causing relays 127 and 179 to be released. The system is then ready to transmit and receive further ringing signals.

*Call from subscriber to central office*

Before a subscriber places a call, the system is in the condition which has been described as existing just prior to and just after a call from the office to the subscriber. The subscriber's set is in its on-hook condition. When the subscriber initiates a call, he lifts his switch-hook, causing substantially a short-circuit to be placed across the voice line 145 leading from the outlying terminal illustrated in Figs. 3A and 3B. D.-C. source 180 then causes pulse-repeating relay 179 to operate, and this in turn causes supervisory relay 127 to operate. As explained previously, operation of supervisory relay 127 activates compressor 146, transmitting amplifier 149, and oscillator 148 by supplying a ground connection. Carrier is thus supplied to modulator 147 and transmitted over the carrier line 14 to the office terminal. Power to operate the calling subset is supplied to voice line 145 from D.-C. source 180.

At the office terminal, the incoming carrier frequency is selected by channel filter 81 and passes through receiving amplifier 82 and supervisory signal amplifier 106 to detector 107. The output of detector 107 operates relay 96, causing a short-circuit to be placed between the two halves of winding 53 in the office terminal voice line 51. The ringing signal generation means is thus removed from the voice line in the office terminal. The presence of the carrier frequency may, for example, be used to light a lamp at the central office, thus performing the supervisory function of indicating when the subscriber's set is in its off-hook condition.

When the subscriber dials, his subset operates in the usual manner to open and close the switch-hook in a predetermined manner. Rapidly opening and closing the switch-hook in this manner operates pulse-repeating relay 179, which is a fast-operating relay. Relay 179 rapidly applies and removes the short-circuit at the input side of transmitting amplifier 149. Supervisory relay 127, however, is a slow-release relay and remains in its closed position. In this manner, as the subscriber dials, the carrier frequency generated by oscillator 148 and applied through modulator 147 and transmitting amplifier 149 to the carrier line 14 is pulsed. Presence of the carrier frequency on line 14 indicates the absence of a dial pulse, while momentary absence of the carrier indicates the presence of a dial pulse. The pulsed carrier then travels over the carrier line 14 to the office terminal, where the information carried by the pulses is used to control switching equipment to connect the channel to the desired terminating subscriber's line and cause the central office equipment to apply ringing signals to that line.

Reverting calls from one subscriber to another on the same multiparty line are handled in the usual manner. The supervisory signal and the dial pulses are transmitted from the outlying terminal to the office terminal in the manner which has been described. The calling subscriber then hangs up, and ringing information is transmitted from the office terminal back to the same outlying terminal until the called subscriber lifts his switch-hook.

Finally, it should be noted that the system which has been described may be used to provide other types of service than that described. For example, if private-line service were desired, the equipment associated with switches 98 and 104 in Fig. 2 and relays 163 and 166 in Fig. 3B would not be used. The same would be true if multiparty-line full code ringing service were desired. For divided code ringing multiparty-line service, the equipment associated with switch 104 in Fig. 2 and relay 166 in Fig. 3B would not be used.

As has been mentioned previously, one major advantage of the transistorized rural carrier telephone transmission system which has been described is that the use of local primary D.-C. power supplies at each outlying or satellite carrier terminal is facilitated. Not only do the transistors have extremely low power requirements in comparison with vacuum tubes, but they also have zero warm-up times. In other words, the transistors are fully operational the moment power is applied. The system which has been described provides means for removing D.-C. power from the transmitting section of each outlying terminal while the terminal is at rest. The average power drain on the local D.-C. power supply is thereby reduced still further, and the use of local primary power supplies, where desired, is additionally facilitated.

*Alternative outlying carrier terminal—Figs. 3A and 7*

Figs. 3A and 7, taken together, illustrate an alternative pole-mounted outlying or satellite terminal for use in the embodiment of the invention shown in Fig. 1. For a complete representation of the terminal, Fig. 3A should be placed immediately to the left of Fig. 7, with the leads ending at the right-hand side of Fig. 3A connecting with those beginning at the left-hand side of Fig. 3B.

Those portions of Fig. 7 which are substantially the same as corresponding portions of Fig. 3B bear the same reference characters as the portions in Fig. 3B and will not be redescribed. The portions of Fig. 7 which are the same as Fig. 3B comprise, principally, resistors 131 through 133, lightning protection diodes 134 and 135, voice line transformer 142, the resistance pad made up of resistors 138 through 140, supervisory relay 127, pulse-repeating relay 179, and the paths supplying voice tones $f_1$, $f_2$, and $f_3$ to fast-acting relays 160, 163, and 166.

At the right-hand side of Fig. 7, voice line 145 is connected across the secondary windings 175 of transformer 142 by a pair of slow-release relays 301 and 302. Relay 301 is a four-armature relay arranged with four front contacts and two back contacts. The first back contact 303 is normally connected through its associated armature to the R side of voice line 145, while the other back contact 304 is normally connected through its armature to the T side of the line. A front contact 305 is associated with the R armature of relay 301, and a front contact 306 is associated with the T armature. Front contact 306 is grounded. The remaining two armatures of relay 301 have only front contacts 307 and 308 associated with them.

Relay 302 is substantially identical to relay 301 and also has four armatures, two of which have associated front and back contacts and the other two of which have only associated front contacts. One of the two-contact armatures of relay 302 is connected to back contact 304 of relay 301, and its associated back contact 309 is connected directly to the T side of divided secondary winding 175. The other two-contact armature of relay 302 is connected to back contact 303 of relay 301, and its associated back contact 310 is connected directly to the R side of secondary winding 175. The first two-contact armature of relay 302 is provided with a front contact 311, while the second two-contact armature is provided with a grounded front contact 312. The remaining two armatures of relay 302 are associated only with front contacts 313 and 314, respectively.

The armatures of relay 301 associated with front contacts 307 and 308 and the armatures of relay 302 associated with front contacts 313 and 314 are all connected to the negative side of a D.C. supply source 315. The positive side of source 315 is grounded. Contact 305 of relay 301 and contact 311 of relay 302 are connected together through a small resistor 316 to the back contact of fast-acting relay 160 and through a low-pass filter composed of a series inductance 317 and a shunt capacitor 318 to the armature of fast-acting relay 166. The armature of relay 160 is grounded, and its front contact is connected to the armature of fast-acting relay 163. The back contact of relay 163 is connected through the operating coil of slow-release voice line relay 301 to the negative side of source 315. The front contact of relay 163 is connected through the operating coil of relay 302 to the negative side of source 315.

The front and back contacts of relay 166 are connected to respective sources of positive and negative potential supplied from an oscillator 319 and its associated rectifier circuit. To the output terminals of oscillator 319 is connected a primary winding 320 of a transformer 321. The secondary winding 322 of transformer 321 has its center point grounded and its respective ends connected through a full-wave rectifier made up of four diodes 323, 324, 325, and 326 to the respective front and back contacts of relay 166. Diodes 323 and 324 are oppositely poled and make up the series arms of the full-wave rectifier, while oppositely poled diodes 325 and 326 make up the cross arms. The polarities of the diodes are arranged so that diodes 323 and 325 supply a negative potential to the back contact of relay 166, while diodes 324 and 326 supply a positive potential to the front contact. Oscillator 319 is supplied with D.C. power from a lead connected directly to contacts 305 and 308 of relay 301 and contacts 313 and 314 of relay 302.

For more complete details of the alternative outlying carrier terminal illustrated in Figs. 3A and 7, reference is again made to the above-identified copending application by D. C. Weller.

*Operation of office and outlying terminals—Figs. 2, 3A, and 7*

The detailed operation of the office and outlying carrier terminals illustrated in Figs. 2, 3A, and 7 may also best be set forth by describing the progress first of a call from a central office to a subscriber and second of a call from a subscriber to the central office. Since, for the most part, the operation is the same as with the terminals shown by the combination of Figs. 2, 3A, and 3B, the present description is largely confined to the respects in which the present operation differs from that of the other combination of figures.

*Call from central office to subscriber*

A principal difference between the operation of the office terminal in the present example and that in the previous example is that a somewhat different ringing code is used. Fig. 8A is a chart setting forth this different ringing code. As before, a check mark in a tone column indicates the presence of a particular tone in each instance.

Fig. 8B is the same as Fig. 6B and illustrates the wave-forms of the ringing voltages applied by the standard central office equipment to the office terminal of Fig. 2. As before, in a four-party full-selective system (e.g., that servicing subscribers A, B, C, and D in Fig. 1), each party is rung by a different one of the four ringing combinations. Reading from left to right in Fig. 8B, the wave-forms illustrated are supplied to the office terminal to ring parties A, B, C, and D, respectively.

Fig. 8C illustrates the voice-frequency tones transmitted, in accordance with a feature of the present invention, to modulator 65 in Fig. 2 in the combination which includes the outlying terminal illustrated in Figs. 3A and 7. As before, these tones are used to modulate the outgoing carrier and to convey the appropriate ringing information to the outlying terminal.

Fig. 8D illustrates the ringing voltage wave-forms recreated from the received ringing signal voice tones at the outlying terminal disclosed in Figs. 3A and 7.

The principal difference in the operation of the office terminal of Fig. 2 in the present example from its operation in the previous example is with regard to switch 104. In the present example, it is assumed (in accordance with the code of Fig. 8A) that switch 104 passes frequency $f_3$ to amplifier 105 whenever either T or R is positive with respect to ground. Thus, as illustrated in Fig. 8C, a positive ringing signal on R causes tones $f_1$ and $f_3$ to flow, a negative ringing signal on R causes only tone $f_1$ to flow, a positive ringing signal on T causes tones $f_1$, $f_2$, and $f_3$ to flow, while a negative ringing signal on T causes tones $f_1$ and $f_2$ to flow.

While the subscriber set is still in its on-hook condition, the carrier-frequency ringing tones transmitted by the office terminal of Fig. 2 are received at the carrier side of the outlying terminal illustrated in Figs. 3A and 7. There, they pass through channel filter 119 and receiving amplifier 124 to demodulator 125. The reconstructed voice tones then, as in the previous example, pass through expandor 126 and the single back contact of supervisory relay 127 to the input sides of the three amplifiers 155, 156, and 157. These amplifiers, as before, pass tones $f_1$, $f_2$, and $f_3$, respectively, to the operating coils of relays 160, 163, and 166.

When tone $f_1$ is present in the outlying terminal of Figs. 3A and 7, relay 160 is operated, completing the connection to ground through source 315 and the operating coil of relay 301. Relay 301 operates, disconnecting voice line 145 from transformer 142 and connecting contact 305 of relay 301 to the R side of the line. The T side of the line is grounded through contact 306. Since relay 165 remains unoperated, its armature and back contact connect the R side of voice line 145 to the negative terminal of the full-wave rectifier associated with oscillator 319. Since relay 301 is a slow-release relay, it remains operated throughout the duration of the ring. Relay 160, however, is a fast-acting relay which operates on a per-cycle rather than a per-ring basis. Since tone $f_1$ is applied to the operating coil of relay 160 in bursts, relay 160 is operated at a rate corresponding to the frequency of the bursts. In the presence of a burst of tone $f_1$, relay 160 is operated, causing its armature to move to its front contact. Between bursts, however, the armature returns to its back contact and supplies substantially a short-circuit to ground from the R side of the voice line 145. In this manner, the ringing signal recreated on voice line 145 is composed of a ringing frequency (20-cycle) A.-C. wave superimposed upon D.-C. The second column of Fig. 8D illustrates the recreated negative ringing signal on R.

Tones $f_1$ and $f_3$ are transmited to amplifiers 155, 156, and 157 when the ringing signal to be recreated on voice line 145 is positive on R. The bursts of the tone $f_1$ operate relay 160 in the manner which has ben described, but the presence of tone $f_3$ operates relay 166, causing its armature to move to its front contact and supply a positive D.-C. potential to the R side of voice line 145 from the rectifier associated with oscillator 319. The resulting ringing voltage wave-form is that illustrated in the first column of Fig. 8D and is a positive voltage on R.

When, as shown in the third column of Fig. 8C, all three voice-frequency ringing tones are applied to the outlying carrier terminal illustrated in Figs. 3A and 7, relays 160 and 166 operate in the manner described. The presence of tone $f_2$, however, operates relay 163 and causes the ground connection supplied through the front contact of relay 160 to go to the operating coil of relay 302 instead of that of relay 301. As a result, relay 301 is released, and its respective back contacts 303 and 304 are once again connected to the R and T sides, respectively, of voice line 145. Relay 302, however, is now operated, and voice line 145 is disconnected from transformer 142. The R side of voice line 145 is now grounded, and the T side is supplied with a potential the polarity of which is determined by the position of the armature of relay 166. In the presence of all three tones, relay 166 is operated, and its armature supplies a positive potential to the R side of the line. The resulting ringing voltage wave-form appearing on voice line 145 is that illustrated in the third column of Fig. 8D.

The final possibility is that of the presence only of tones $f_1$ and $f_2$. As shown in the fourth column of Fig. 8C, these tones are provided when the ringing signal to be reconstructed is negative on T. When tones $f_1$ and $f_2$ are present, relay 160 operates in the manner already described, and relay 163 operates to connect the operating coil of relay 302 to the front contact of relay 160. The operating coil of relay 301 is disconnected. The resulting recreated ringing signal, illustrated in the fourth column of Fig. 8D, is provided by the ground connection on the R side of voice line 145 and the connection through contact 311 from the T side of voice line 145 through the back contact of relay 166 to the negative side of the full-wave rectifier associated with oscillator 319.

When the called subscriber answers, his switch-hook is lifted and substantially a short-circuit is placed across voice line 145 leading from the outlying terminal. Since ringing has ceased, voice line 145 is connected directly across the secondary winding 175 of transformer 142, and D.-C. source 180 causes a current to flow in the operating coil of pulse-repeating relay 179. Relay 179 operates in the manner described in connection with Figs. 2, 3A, and 3B and closes a circuit including the operating coil of supervisory relay 127 and D.-C. source 180. In accordance with a previously described feature of the invention, source 180 remains connected across voice line 145 by way of winding 175 to power the subscriber set microphone in use on the line. Supervisory relay 127 in Fig. 7 operates in the same manner as it does in Fig. 3B and breaks the connection to ringing tone amplifiers 155, 156, and 157 and activates compressor 146, transmitting amplifier 149, and carrier oscillator 148. In addition, it closes the open-circuit between transmitting amplifier 149 and channel filter 150 in Fig. 3A and connects the output of expandor 126 to the resistance bridge composed of resistors 131 through 133.

In this manner, ringing signals are prevented from reaching the subscriber when his subset is in its off-hook condition, relays 301 and 302 are locked open, and the transmitting side of the outlying terminal is ready for operation.

When the conversation is completed, the subscriber hangs up, as before, restoring his subset to its on-hook condition. A substantially open-circuit is restored across voice line 145, causing relays 127 and 179 to be released. The system is then ready to transmit and receive further ringing signals.

*Call from subscriber to central office*

The operation of the combination of equipment illustrated in Figs. 2, 3A, and 7 for a call originated by a subscriber serviced from the pole-mounted outlying terminal is substantially the same as the operation of the equipment shown in Figs. 2, 3A, and 3B and will not be redescribed.

It is to be understood that the arrangements which have been described are illustrative of the application of the principles of the invention. Numerous other embodiments may be devised by those skilled in the art without departing from the spirit and scope of the invention.

What is claimed is:

1. A telephone system intercoupling a central office and a plurality of telephone subscribers which comprises, in combination, a plurality of primary carrier terminals at said central office; each of said primary terminals including modulation means, demodulation means, means to code the information contained in an applied subscriber ringing signal in terms of a plurality of separate and distinct voice-frequency tones, and means to apply said voice-frequency tones simultaneously to said modulation means; a carrier transmission line coupled to said primary terminals; a like number of satellite carrier terminals associated with respective ones of said primary terminals and dispersed at intervals along said carrier line remote from said central office; each of said satellite terminals including modulation means, demodulation means, and means to recover from said demodulation means said separate and distinct voice-frequency tones generated by the associated primary terminal and recreate therefrom substantially the same subscriber ringing signal applied to the associated primary terminal; whereby each of said satellite terminals and its associated primary terminal provide a carrier channel for the two-way transmission of voice messages and the transmission of subscriber ringing information from the primary terminal to the satellite terminal; and a plurality of voice-frequency transmission lines coupled to respective ones of said satellite terminals to provide continuations of the respective communication channels from the satellite terminals to the telephone subscribers served therefrom.

2. A telephone system intercoupling a central office and a plurality of primary carrier terminals at said central office, each of said primary terminals including modulation means, demodulation means, means to code the information contained in an applied subscriber ringing signal in terms of a plurality of separate and distinct voice-frequency tones, and means to apply said voice-frequency tones simultaneously to said modulation means, a carrier transmission line coupled to said primary terminals, a like number of satellite carrier terminals associated with respective ones of said primary terminals and dispersed at intervals along said carrier line remote from said central office, each of said satellite terminals including modulation means, demodulation means, and means to recover from said demodulation means said separate and distinct voice-frequency tones generated by the associated primary terminal and recreate therefrom substantially the same subscriber ringing signal applied to the associated primary terminal, whereby each of said satellite terminals and its associated primary terminal provide a carrier channel for the two-way transmission of voice messages and the transmission of subscriber ringing information from the primary terminal to the satellite terminal, means to reinsert voice frequencies from at least one of said satellite terminals back onto said carrier line, means including filter means opaque to carrier frequencies to couple the voice-frequency signals from said satellite terminal to the telephone subscribers served therefrom directly from said carrier, line, and a plurality of voice-frequency transmission lines coupled to respective ones of the others of said satellite terminals to provide continuations of the respective communication channels from the satellite terminals to the telephone subscribers served therefrom.

3. A telephone system intercoupling a central office and a plurality of telephone subscribers which comprises, in combination, a plurality of primary carrier terminals at said central office, each of said primary terminals including modulation means, demodulation means, means to code the information contained in an applied subscriber ringing signal in terms of a plurality of separate and distinct voice-frequency tones, and switching means to disconnect voice message signals and apply said voice-frequency tones simultaneously to said modulation means during ringing intervals and to disconnect said voice-frequency tones and apply voice message signals to said modulation means during talking intervals, a carrier transmission line coupled to said primary terminals, a like number of statellite carrier terminals associated with respective ones of said primary terminals and dispersed at intervals along said carrier line remote from said central office, each of said satellite terminals including modulation means, demodulation means, means to recover from said demodulation means said separate and distinct voice-frequency tones generated by the associated primary terminal and recreate therefrom substantially the same subscriber ringing signal applied to the associated primary terminal, and switching means to connect said demodulation means to said tone recovering means during ringing intervals and to disconnect said modulation means from said tone recovering means during talking intervals, whereby each of said satellite terminals and its associated primary terminal provide a carrier channel for the two-way transmission of voice messages and the transmission of subscriber ringing information from the primary terminal to the satellite terminal, and a plurality of voice-frequency transmission lines coupled to respective ones of said satellite terminals to provide continuations of the respective communication channels from the satellite terminals to the telephone subscribers served therefrom.

4. A telephone system intercoupling a central office and a plurality of telephone subscribers which comprises, in combination, a plurality of primary carrier terminals at said central office, each of said primary terminals including modulation means, demodulation means, means to code the information contained in an applied subscriber ringing signal in terms of a plurality of voice-frequency tones, and switching means to disconnect voice message signals and apply said voice-frequency tones to said modulation means during ringing intervals and to disconnect said voice-frequency tones and apply voice message signals to said modulation means during talking intervals, a carrier transmission line coupled to said primary terminals, a like number of satellite carrier terminals associated with respective ones of said primary terminals and dispersed at intervals along said carrier line remote from said central office, each of said satellite terminals including modulation means, demodulation means, means to recover from said demodulation means said voice-frequency tones generated by the associated primary terminal and recreate therefrom the subscriber ringing signal applied to the associated primary terminal, and switching means to connect said demodulation means to said tone recovering means during ringing intervals and to disconnect said modulation means from said tone recovering means during talking intervals, whereby each of said satellite terminals and its associated primary terminal provide a respective carrier channel for the two-way transmission of voice messages and the transmission of subscriber ringing information from the primary terminal to the satellite terminal, means including filter means opaque to carrier frequencies to reinsert voice frequencies from at least one of said satellite terminals back onto said carrier line on the side of said satellite terminal remote from said central office, means including filter means opaque to carrier frequencies to couple the voice-frequency signals from said satellite terminal to the telephone subscribers served therefrom directly from said carrier line, and a plurality of voice-frequency transmission lines coupled to respective ones of the others of said satellite terminals to provide continuations of the respective communication channels from the satellite terminals to the telephone subscribers served therefrom.

5. A telephone system intercoupling a central office and a plurality of telephone subscribers which comprises, in combination, a plurality of primary carrier terminals at said central office, each of said primary terminals including modulation means, demodulation means, means to code the information contained in an applied subscriber ringing signal in terms of a plurality of separate and distinct voice-frequency tones, and switching means to disconnect voice message signals and apply said voice-frequency tones simultaneously to said modulation means during ringing intervals and to disconnect said voice-frequency tones and apply voice message signals to said modulation means during talking intervals, a carrier transmission line coupled to said primary terminals, a like number of satellite carrier terminals associated with respective ones of said primary terminals and dispersed at intervals along said carrier line remote from said central office, each of said satellite terminals including modulation means, demodulation means, means to recover from said demodulation means said separate and distinct voice-frequency tones generated by the associated primary terminal and recreate therefrom substantially the same subscriber ringing signal applied to the associated primary terminal, switching means to connect said demodulation means to said voice-frequency tone recovering means during ringing intervals and to disconnect said demodulation means from said voice-frequency tone recovering means during talking intervals, and switching means to supply direct-current power for the operation of the subscriber telephone sets served therefrom during talking intervals, whereby each of said satellite terminals and its associated primary terminal provide a respective carrier channel for the two-way transmission of voice messages and the transmission of subscriber ringing information from the primary terminal to the satellite terminal and each of said satellite terminals supplies the direct-current power needed for the operation of the associated subscriber telephone sets during talking intervals, and a plurality of voice-frequency transmission lines coupled to respective ones of said satellite terminals to provide continuations of the respective communication channels from the satellite terminals to the telephone subscribers served therefrom.

6. A telephone system intercoupling a central office and a plurality of telephone subscribers which comprises, in combination, a plurality of primary carrier terminals at said central office, each of said primary terminals including means to code the information contained in an applied subscriber ringing signal in terms of a plurality of separate and distinct voice-frequency tones, a carrier transmission line coupled to said primary terminals, a like number of satellite carrier terminals dispersed at intervals along said carrier line remote from said central office, each of said satellite terminals including means to recreate substantially the same subscriber ringing signal appiled to the associated primary terminal from said voice-frequency tones and each of said satellite terminals being associated with a respective one of said primary terminals to provide a carrier channel for the two-way transmission of voice messages, the transmission of subscriber ringing information from the primary terminal to the satellite terminal, and the transmission of supervisory information from the satellite terminal to the primary terminal, and a plurality of voice-frequency transmission lines coupled to respective ones of said satellite terminals to provide continuations of the respective communication channels from the satellite terminals to the telephone subscribers served therefrom.

7. A telephone system intercoupling a central office and a plurality of telephone subscribers which comprises, in combination, a plurality of primary carrier terminals at said central office, each of said primary terminals including means to code the information contained in an applied subscriber ringing signal in terms of a plurality of voice-frequency tones, a carrier transmission line coupled to said primary terminals, a like number of satellite carrier terminals dispersed at intervals along said carrier line remote from said central office, each of said satellite terminals including means to recreate the subscriber ringing signal applied to the associated primary terminal from said voice-frequency tones and each of said satellite terminals being associated with a respective one of said primary terminals to provide a carrier channel for the two-way transmission of voice messages, the transmission of subscriber ringing information from the primary terminal to the satellite terminal, and the transmission of supervisory information from the satellite terminal to the primary terminal, means to reinsert voice frequencies from at least one of said satellite terminals back onto said carrier line, means including filter means opaque to carrier frequencies to couple the voice-frequency signals from said satellite terminal to the telephone subscribers served therefrom directly from said carrier line, and a plurality of voice-frequency transmission lines coupled to respective ones of the others of said satellite terminals to provide continuations of the respective communication channels from the satellite terminals to the telephone subscribers served therefrom.

8. A telephone system intercoupling a central office and a plurality of telephone subscribers which comprises, in combination, a plurality of primary carrier terminals at said central office, a carrier transmission line coupled to said primary terminals, a like number of satellite carrier terminals dispersed at intervals along said carrier line remote from said central office, each of said satellite terminals being associated with a respective one of said primary terminals to provide a carrier channel for the two-way transmission of voice messages, the transmission of subscriber ringing information from the primary terminal to the satellite terminal, and the transmission of supervisory information from the satellite terminal to the primary terminal, means to reinsert voice frequencies from at least one of said satellite terminals back onto said carrier line, means including filter means opaque to carrier frequencies to couple the voice-frequency signals from said satellite terminal to the telephone subscribers served therefrom directly from said carrier line, and a plurality of voice-frequency transmission lines coupled to respective ones of the others of said satellite terminals to provide continuations of the respective communication channels from the satellite terminals to the telephone subscribers served therefrom.

9. A telephone system intercoupling a central office and a plurality of multiparty-line telephone subscribers which comprises, in combination, a plurality of primary carrier terminals at said central office, a carrier transmission line coupled to said primary terminals, a like number of satellite carrier terminals dispersed at intervals along said carrier line remote from said central office, each of said satellite terminals being associated with a respective one of said primary terminals to provide a carrier channel for the two-way transmission of voice messages, means including filter means opaque to carrier frequencies to reinsert voice frequencies from at least one of said satellite terminals back onto said carrier line on the side of said satellite terminal remote from said central office, means including filter means opaque to voice frequencies to bypass other carrier frequencies around said satellite terminal on said carrier line, and means including filter means opaque to carrier frequencies to couple the voice-frequency signals from said satellite terminal to the telephone subscribers served therefrom directly from said carrier line.

10. A telephone system intercoupling a central office and a plurality of subscribers which comprises, in combination, a plurality of primary carrier terminals at said central office, a carrier transmission line coupled to said primary terminals, a like number of satellite carrier terminals dispersed at intervals along said carrier line remote from said central office, each of said satellite terminals being associated with a respective one of said primary terminals to provide a respective outgoing carrier channel for the transmission of voice messages and ringing information from the primary terminal to the satellite terminal and a respective incoming carrier channel for the transmission of voice messages and supervisory and dialing information from the satellite terminal to the primary terminal, at least one two-way carrier-frequency repeater on said transmission line intermediate said central office and at least some of said satellite terminals, means including filter means opaque to carrier frequencies to reinsert voice frequencies from at least one of said satellite terminals back onto said carrier line on the side of said satellite terminal remote from said central office, means including filter means opaque to carrier frequencies to couple the voice frequency signals from said satellite terminal to the telephone subscribers served therefrom directly from said carrier line, and a plurality of voice-frequency transmission lines coupled to respective ones of the others of said satellite terminals to provide continuations of the respective two-way communication channels from the satellite terminals to the subscribers served therefrom.

11. A telephone system intercoupling a central office and a plurality of subscribers which comprises, in combination, a plurality of primary carrier terminals at said central office, a carrier transmission line coupled to said primary terminals, a like number of satellite carrier terminals dispersed at intervals along said carrier line remote from said central office, each of said satellite terminals being associated with a respective one of said primary terminals to provide a respective outgoing carrier channel for the transmission of voice messages and ringing information from the primary terminal to the satellite terminal and a respective incoming carrier channel for the transmission of voice messages and supervisory and dialing information from the satellite terminal to the primary terminal, all of said outgoing carrier channels occupying adjacent bands in one part of the frequency spectrum and all of said incoming carrier channels occupying adjacent bands in another part of the frequency spectrum, at least one two-way carrier-frequency repeater on said transmission line intermediate said central office and at least some of said satellite terminals, means including filter means opaque to carrier frequencies to reinsert voice frequencies from at least one of said satellite terminals back onto said carrier line on the side of said satellite terminal remote from said central office, means including filter means opaque to carrier frequencies to couple the voice frequency signals from said satellite terminal to the telephone subscribers served therefrom directly from said carrier line, and a plurality of voice-frequency transmission lines coupled to respective ones of the others of said satellite terminals to provide continuations of the respective two-way communication channels from the satellite terminals to the subscribers served therefrom.

12. A telephone system intercoupling a central office and a plurality of subscribers which comprises, in combination, a plurality of primary carrier terminals at said central office, a carrier transmission line coupled to said primary terminals, a like number of satellite carrier terminals dispersed at intervals along said carrier line remote from said central office, each of said satellite terminals being associated with a respective one of said primary terminals to provide a respective outgoing carrier channel for the transmission of voice messages and ringing information from the primary terminal to the satellite terminal and a respective incoming carrier channel for the transmission of voice messages and supervisory and dialing information from the satellite terminal to the primary terminal, all of said outgoing carrier channels occupying adjacent bands in a first part of the frequency spectrum and all of said incoming channels occupying adjacent bands in a second part of the frequency spectrum below said first part, at least one two-way carrier-frequency repeater on said transmission line intermediate said central office and at least some of said satellite terminals, means including filter means opaque to carrier frequencies to reinsert voice frequencies from at least one of said satellite terminals back onto said carrier line on the side of said satellite terminal remote from said central office, means including filter means opaque to carrier frequencies to couple the voice frequency signals from said satellite terminal to the telephone subscribers served therefrom directly from said carrier line, and a plurality of voice-frequency transmission lines coupled to respective ones of the others of said satellite terminals to provide continuations of the respective two-way communication channels from the satellite terminals to the subscribers served therefrom.

13. A telephone system intercoupling a central office and a plurality of telephone subscribers which comprises, in combination, a plurality of primary carrier terminals at said central office; each of said primary terminals including modulation means, demodulation means, means to code the information contained in an applied subscriber ringing signal in terms of a plurality of separate and distinct voice-frequency tones, means to apply said voice-frequency tones simultaneously to said modulation means, and switching means to disconnect said coding means from said modulation means in the presence of a received carrier wave; a carrier transmission line coupled to said primary terminals; a like number of satellite carrier terminals associated with respective ones of said primary terminals and dispersed at intervals along said carrier line remote from said central office; each of said satellite terminals including modulation means, demodulation means, means to recover from said demodulation means said separate and distinct voice-frequency tones generated by the associated primary terminal and recreate therefrom substantially the same subcriber ringing signal applied to the associated primary terminal, and means to transmit carrier over said carrier line whenever a subscriber telephone set associated with the satellite terminal is changed from its on-hook to its off-hook condition;

whereby each of said satellite terminals and its associated primary terminal provide a respective outgoing channel for the transmission of voice messages and ringing information from the primary terminal to the satellite terminal and a respective incoming carrier channel for the transmission of voice messages and supervisory information from the satellite terminal to the primary terminal; and a plurality of voice-frequency transmission lines coupled to respective ones of said satellite terminals to provide continuations of the respective communication channels to the telephone subscribers served therefrom.

14. A telephone system in accordance with claim 13 in which at least some of said satellite carrier terminals include means to interrupt the carrier transmitted over the carrier line from the satellite terminal to the primary terminal during each dialing pulse appearing on the respective voice-frequency subscriber distribution line coupled to the satellite terminal.

References Cited in the file of this patent

UNITED STATES PATENTS

| | | |
|---|---|---|
| 2,202,474 | Vroom | May 28, 1940 |
| 2,499,180 | Bossart | Feb. 28, 1950 |
| 2,542,592 | Styrene | Feb. 20, 1951 |
| 2,654,804 | Edson | Oct. 6, 1953 |